United States Patent
Rabnawaz et al.

(10) Patent No.: US 12,460,088 B2
(45) Date of Patent: Nov. 4, 2025

(54) OMNIPHOBIC COMPOSITIONS WITH NANOFILLER ADDITIVES, RELATED ARTICLES, AND RELATED METHODS

(71) Applicant: BOARD OF TRUSTEES OF MICHIGAN STATE UNIVERSITY, East Lansing, MI (US)

(72) Inventors: Muhammad Rabnawaz, Okemos, MI (US); Muhammad Naveed, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 447 days.

(21) Appl. No.: 17/785,993

(22) PCT Filed: Dec. 17, 2020

(86) PCT No.: PCT/US2020/065687
§ 371 (c)(1),
(2) Date: Jun. 16, 2022

(87) PCT Pub. No.: WO2021/127229
PCT Pub. Date: Jun. 24, 2021

(65) Prior Publication Data
US 2023/0028815 A1    Jan. 26, 2023

Related U.S. Application Data

(60) Provisional application No. 62/951,273, filed on Dec. 20, 2019.

(51) Int. Cl.
C09D 5/00       (2006.01)
C09D 133/08     (2006.01)
C09D 133/14     (2006.01)

(52) U.S. Cl.
CPC ............ *C09D 5/00* (2013.01); *C09D 133/08* (2013.01); *C09D 133/14* (2013.01)

(58) Field of Classification Search
None
See application file for complete search history.

(56) References Cited

U.S. PATENT DOCUMENTS

| | | | |
|---|---|---|---|
| 5,380,901 A * | 1/1995 | Antonucci | C08G 77/48 556/440 |
| 11,053,337 B2 | 7/2021 | Rabnawaz | |
| 11,118,003 B2 | 9/2021 | Rabnawaz et al. | |
| 11,135,617 B2 | 10/2021 | Rabnawaz | |
| 11,155,732 B2 | 10/2021 | Rabnawaz et al. | |
| 11,396,574 B2 | 7/2022 | Rabnawaz et al. | |
| 11,746,176 B2 | 9/2023 | Rabnawaz et al. | |
| 11,802,204 B2 | 10/2023 | Rabnawaz | |
| 11,814,470 B2 | 11/2023 | Rabnawaz et al. | |
| 11,814,540 B2 | 11/2023 | Rabnawaz et al. | |
| 2016/0194574 A1 | 7/2016 | Gross et al. | |
| 2016/0200937 A1 | 7/2016 | Hu et al. | |
| 2018/0327608 A1 | 11/2018 | Aizenberg et al. | |
| 2019/0256716 A1 | 8/2019 | De Coninck et al. | |
| 2020/0048459 A1 | 2/2020 | Rabnawaz | |
| 2020/0239806 A1 * | 7/2020 | Kim | C10M 107/38 |
| 2020/0347179 A1 | 11/2020 | Rabnawaz et al. | |
| 2022/0145088 A1 | 5/2022 | Rabnawaz et al. | |

FOREIGN PATENT DOCUMENTS

WO   WO-2019/099608 A1   5/2019
WO   WO-2019/199713 A1   10/2019

OTHER PUBLICATIONS

International Application No. PCT/US2020/065687, International Search Report and Written Opinion, mailed Mar. 8, 2021.
U.S. Appl. No. 18/367,079, filed Sep. 12, 2023.

* cited by examiner

*Primary Examiner* — Sheeba Ahmed
(74) *Attorney, Agent, or Firm* — MARSHALL, GERSTEIN & BORUN LLP

(57) ABSTRACT

The disclosure relates to a thermoset omniphobic composition with favorable dirt repellency and water resistance properties. The composition can be used as a protective coating on a substrate. Such coatings, when contacted with soil, dirt, dust, etc., remain clean and transparent. The omniphobic composition generally includes a thermoset polymer, an omniphobic polymer, and a filler or nanofiller. The thermoset polymer can be a crosslinked acrylate or other vinyl polymer. The omniphobic polymer can include fluorocarbon and/or siloxane groups for improving water resistance. The nanofiller can include nanosilica and/or nanoclay. The thermoset polymer and the omniphobic polymer together form a matrix for the filler as a dispersed phase throughout the matrix. A coated substrate with the thermoset omniphobic composition thereon exhibits favorable water contact and sliding angles as well as favorable transparency values in dirt accumulation tests.

28 Claims, 7 Drawing Sheets

OMNIPHOBIC COMPOSITIONS WITH NANOFILLER ADDITIVES, RELATED ARTICLES, AND RELATED METHODS

CROSS REFERENCE TO RELATED APPLICATION

This application is a National Stage application of International Application No. PCT/US2020/065687, filed Dec. 17, 2020, which claims priority to U.S. Provisional Application No. 62/951,273 (filed Dec. 20, 2019), which is incorporated herein by reference in its entirety.

STATEMENT OF GOVERNMENT INTEREST

None.

BACKGROUND OF THE DISCLOSURE

Field of the Disclosure

The disclosure relates to a thermoset omniphobic composition with favorable dirt repellency and water resistance properties, which can be used as a protective coating on a substrate. The omniphobic composition includes a thermoset polymer and an omniphobic polymer as a matrix for a filler dispersed phase throughout the matrix. A coated substrate with the thermoset omniphobic composition thereon exhibits favorable water contact and sliding angles as well as favorable transparency values in dirt accumulation tests.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible for the water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays, so that body oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

SUMMARY

In one aspect, the disclosure relates to a thermoset omniphobic composition comprising: a thermoset polymer comprising a polymerization reaction product (e.g., networked reaction product, such as a UV-cured reaction product) between: an ethylenic-polyfunctional (or vinylic-polyfunctional) first monomer, and optionally an ethylenic-functional (or vinylic-functional) second monomer which is different from the ethylenic-polyfunctional first monomer; an omniphobic polymer (e.g., blended with or covalently bonded to the thermoset polymer network); and at least one (hydrophobic) filler such as a nanofiller distributed throughout the thermoset polymer (e.g., throughout the thermoset polymer and omniphobic polymer), the filler being selected from the group consisting of nanoclay, graphene oxide, graphene, silicon dioxide (silica), aluminum oxide, cellulose nanocrystals, carbon nanotubes, titanium dioxide (titania), diatomaceous earth, and combinations thereof. The thermoset omniphobic composition is generally in the form of a composite composition with the thermoset polymer and omniphobic polymer as a continuous matrix phase and the fillers or nanofillers as a dispersed phase distributed throughout the matrix. As described herein, the omniphobic polymer can be blended with the thermoset polymer to form the matrix, or the omniphobic polymer can be covalently bonded to the thermoset polymer to form part of the network matrix.

The ethylenic-polyfunctional (or vinylic-polyfunctional) first monomer is suitably a monomer with 2 or more unsaturated ethylenic (or vinylic) groups (e.g., at least 2, 3, or 4 and/or up to 2, 4, 6, 8, or 10 ethylenic groups). The ethylenic groups in the various monomers can be represent by C=C groups, for example in (meth)acrylate groups; (meth)acrylamide groups; vinyl groups such as in vinyl aromatics (e.g., divinyl benzene), vinyl acetates (e.g., divinyl acetates), divinyl ethers; and polyfunctional alkene groups at terminal chain positions such as alkyl dienes, trienes, etc.

The ethylenic-functional (or vinylic-functional) second monomer is an optional component of the thermoset polymer, but it suitably is included to control/adjust mechanical properties, chemical properties, and/or degree of crosslinking of the thermoset polymer. When included, the ethylenic-functional second monomer is suitably a monomer with 1 or more, preferably only 1, unsaturated ethylenic (or vinylic) group (e.g., at least 1, 2, 3, or 4 and/or up to 2, 4, 6, 8, or 10 ethylenic groups), which can be a (meth)acrylate group, (meth)acrylamide group, vinyl group, or other terminal alkene group as noted above.

The omniphobic polymer is generally a polymer, for example a copolymer as described below, with one or more omniphobic groups such as fluorinated groups, siloxane groups, etc. In an embodiment, the omniphobic polymer is free or substantially free of available acrylate or other ethylenic polymerizable groups, such groups having been reacted/consumed from their respective monomers during formation of the omniphobic polymer. In such case, the omniphobic polymer generally forms a physical blend with the thermoset matrix (i.e., the omniphobic polymer does not react with or is not otherwise covalently bonded to the thermoset network). In another embodiment, the omniphobic polymer can be an ethylenic-functional omniphobic polymer having 1 or more unsaturated ethylenic groups (e.g., at least 1, 2, 3, or 4 and/or up to 2, 4, 6, 8, or 10 ethylenic groups), which can be a (meth)acrylate group, (meth)acrylamide group, vinyl group, or other terminal alkene group as noted above. The additional ethylenic-functionality can result from inclusion of a polyfunctional comonomer when forming the omniphobic polymer and prior to forming the thermoset polymer. In this case, the ethylenic-functionality of the omniphobic polymer can react with the ethylenic-polyfunctional first monomer and the ethylenic-functional second monomer (when present) such that the omniphobic polymer becomes covalently bonded component of the thermoset polymer and corresponding matrix.

Various refinements of the disclosed thermoset omniphobic composition are possible.

In a refinement, the ethylenic-polyfunctional first monomer is selected from the group consisting of 1,6-hexanediol diacrylate (HDDA), 1,4-butane diol diacrylate (BDDA), 1,6-hexanediol dimethyl acrylate (HDMDA), 1,4-benzenediol dimethyl acrylate (BDMDA), trimethylolpropane triacrylate (TMPTA), trimethylolpropane formalacrylate, dipropylene glycol diacrylate (DPGDA), pentaerythritol triacrylate (PETIA), and combinations thereof. Other suitable first monomers more generally can include mono-, di-, tri-, tetra-, and polyethyleneglycol diacrylates and dimethacylates; alkane diol diacrylates and dimethacylates such as based on 1,6-hexanediol, 1,4-butane diol, 1,3-butane diol, 1,5-pentanediol, 1,9-nonane diol, and 1,10-decanediol; allyl methacrylate; N,N-diallylacrylamide; and methylenebisacrylamide.

The ethylenic-polyfunctional first monomer suitably has terminal C═C reactive groups, such as a (meth)acrylate or (meth)acrylamide polyfunctional monomer. An example of a suitable (meth)acrylate functional group is $CH_2$═CR—C(═O)O—X. X can independently be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of R as H corresponds to an acrylate/acrylic acid functional group. Selection of R as $CH_3$ corresponds to an methacrylate/methacrylic acid functional group. An example of a suitable (meth)acrylamide functional group is $CH_2$═CR—C(═O)NX'—X, where R and X are as defined above, and X' can be independently selected from the same options as X (e.g., H or otherwise).

An example of a corresponding acrylate-based ethylenic-polyfunctional first monomer is $[CH_2$═CR—C(═O)O—$]_m$—$R_a$. The index m can have a value of 2 or more (e.g., for a poly-functional monomer), for example being at least 2, 3, 4, 6, 8, or 10 and/or up to 3, 4, 6, 8, 10, 12, or 15. The $R_a$ group as an organic core or body portion of the eventual cured thermoset polymer can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms. More generally, the ethylenic-polyfunctional first monomer can be an ester reaction product between (for example) an acrylic acid compound (e.g., $CH_2$═CR—C(═O)OH with R as defined above) and a polyol, such as a polyol having 2, 3, or 4 hydroxyl groups on aromatic, alicyclic, and/or aliphatic groups having at least 2, 4, 6, or 10 and/or up to 4, 8, 12, 16, or 20 carbon atoms. Similarly, an example of a corresponding acrylamide-based ethylenic-polyfunctional first monomer is $[CH_2$═CR—C(═O)NX'—$]_m$—$R_a$, where R, $R_a$, and X' are as defined above.

In a refinement, the ethylenic-functional second monomer is present in the thermoset polymer and is selected from the group consisting of isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl)benzotriazole, phenyl methacrylate, 2-phenylethyl acrylate, 2-phenylethyl methacrylate, phenyl acrylate, cinnamyl methacrylate, benzyl acrylate, and combinations thereof. The ethylenic-functional second monomer suitably includes highly non-polar monomers with high boiling point and good rigidity. The high boiling point prevents the monomers from evaporating during UV curing, while high rigidity impart physical hardness for good anti-dirt properties. Rigidity can be based on the inclusion of aliphatic or aromatic cyclic or heterocyclic units in the monomer. The ethylenic-functional second monomer generally includes any monomers that are polymerizable or copolymerizable via free-radical polymerization. An example formula can include $CH_2$═CHR where R is phenyl or other aromatic as in styrene, a nitrile as in acrylonitrile, a halogen as in vinyl chloride, an acetate as in vinyl acetate, an ether as in a vinyl ether, a linear or cyclic (hetero)alkyl group as in a 1-alkene, an ester as in an acrylate, and an amide as in an acrylamide. Another example formula can include $CH_2$═CRR', such as where R is methyl and R' is ester as in methyl methacrylate.

An example of a suitable (meth)acrylate functional group is $CH_2$═CR—C(═O)O— as described above, although the selection for R can be same or different from those as between the ethylenic-functional second monomer and the ethylenic-polyfunctional first monomer. An example of a corresponding acrylate-based ethylenic-functional second monomer is $CH_2$═CR—C(═O)O—$R_2$. The $R_2$ group can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms. An example of a suitable (meth)acrylamide functional group is $CH_2$═CR—C(═O)NX'— as described above, although the selection for R and X' can be same or different from those as between the ethylenic-functional second monomer and the ethylenic-polyfunctional first monomer. Likewise, an example of a corresponding acrylamide-based ethylenic-functional second monomer is $CH_2$═CR—C(═O)NX'—$R_2$, where R, $R_2$, and X' are as defined above.

In a refinement, the omniphobic polymer comprises a copolymer between: an ethylenic-functional omniphobic third monomer; and an ethylenic-functional fourth monomer different from the third monomer. The omniphobic polymer suitably includes 5-80 wt. % or 20-40 wt. % third monomer and 20-95 wt. % or 60-80 wt. % fourth monomer, for example with not more than 10, 5, 2, or 1 wt. % of other comonomers or components besides the third and fours monomers. The ethylenic-functional third and fourth monomers are suitably monomers with 1 or more, preferably only 1, unsaturated ethylenic groups (e.g., at least 1, 2, 3, or 4 and/or up to 2, 4, 6, 8, or 10 ethylenic groups), which can be (meth)acrylate groups, (meth)acrylamide groups, or otherwise. The omniphobic third monomer includes one or more omniphobic functional groups, for example fluorocarbon groups, siloxane groups, etc. Example omniphobic functional groups include perfluorinated carbon atoms (e.g., —$CF_3$ at an omniphobic chain terminus, —$CF_2$— along an omniphobic chain, and a combination of —$(CH_2)_n$($CF_2)_m CF_3$ along an omniphobic chain; chain can be branched or linear), for example at least 2, 3, 4, 6, or 8 and/or up to 4, 8, 12, 16, or 20 perfluorinated carbon atoms in a given omniphobic third monomer. Other example omniphobic functional groups include siloxane repeat units (e.g., $Si(R_1R_2)$—O— repeat units, where $R_1$ and $R_2$ independently can be $C_1$-$C_{12}$ linear or branched alkyl groups (and/or fluoroalkyl groups as described above), $C_4$-$C_{12}$ cycloalkyl groups, unsubstituted aromatic groups, or substituted aromatic groups, in particular where $R_1$ and $R_2$ are methyl groups), for example at least 2, 3, 4, 6, or 8 and/or up to 4, 8, 12, 16, 20, 50, or 100 siloxane repeat units in a given omniphobic third monomer. Other example omniphobic functional groups include fluorosiloxane repeat units, such as including $Si(R_1R_2)$—O— repeat units as above, but with partially or fully fluorinated analogs of the $R_1$ and $R_2$ group, for example including perfluorinated carbon atoms.

In a particular refinement, the ethylenic-functional fourth monomer is selected from the group consisting of isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl)benzotriazole, phenyl methacrylate, 2-phenylethyl acrylate, 2-phenylethyl methacrylate, phenyl acrylate, cinnamyl methacrylate, benzyl acrylate, and combinations thereof. The ethylenic-functional fourth monomer more generally can be selected as described above for the ethylenic-functional second monomer. In some embodiments, the omniphobic polymer can include less reactive internal alkene groups (e.g., non-terminal —C═C— groups), which do not significantly interfere with the free radical polymerization used to make the omniphobic polymer, but which can form a chemical bond with the thermoset polymer matrix in the UV crosslinking stage.

In a particular refinement, the ethylenic-functional second monomer is present in the thermoset polymer; and the ethylenic-functional fourth monomer is the same as the ethylenic-functional second monomer. The ethylenic-functional fourth monomer suitably is a (meth)acrylate mono-functional monomer or a (meth)acrylamide mono-functional monomer. The ethylenic-functional fourth monomer generally can be as described above for the ethylenic-functional second monomer where the second and fourth monomers can be the same or different. Suitably, the second and fourth monomers can be selected to be the same to promote compatibility between the omniphobic polymer and the eventual thermoset polymer matrix, both of which include shared functional groups.

In a particular refinement, the ethylenic-functional omniphobic third monomer comprises a fluorinated acrylate ester. For example, the third monomer can be an ester reaction product between (for example) an acrylic acid compound (e.g., $CH_2$═CR—C(═O)OH with R as defined above) and a fluorinated alcohol, such as an alcohol having at least 2, 3, 4, 6, or 8 and/or up to 4, 8, 12, 16, or 20 perfluorinated carbon atoms on aromatic, alicyclic, and/or aliphatic groups having at least 2, 4, 6, or 10 and/or up to 4, 8, 12, 16, or 20 carbon atoms. An example of a corresponding fluorinated acrylate ester is $CH_2$═CR—C(═O)O—$R_3$. The $R_3$ group can include fluorinated hydrocarbons containing from 2 to 50 carbon atoms, and heteroatom-substituted (e.g., N-, O-, P-, or S-substituted) hydrocarbons containing from 2 to 50 carbon atoms. The hydrocarbons and heteroatom-substituted hydrocarbons can be linear, branched, and/or cyclic, aliphatic and/or aromatic, saturated and/or unsaturated, etc., for example having at least 2, 3, 4, 6, 8, 10, or 20 and/or up to 2, 4, 6, 8, 10, 15, 20, 30, 40, or 50 carbon atoms total and at least 2, 3, 4, 6, or 8 and/or up to 4, 8, 12, 16, or 20 perfluorinated carbon atoms. An example of a suitable fluorinated alcohol is $CF_3(CF_2)_n(CH_2)_2OH$, in which case the corresponding $R_3$ group is $CF_3(CF_2)_n(CH_2)_2$— (i.e., with n+1 perfluorinated carbon atoms). Similarly, the third monomer can be an acrylamide-based fluorinated analog such as $CH_2$═CR—C(═O)NX'—$R_3$, where R, $R_3$, and X' are as defined above.

In another refinement, the omniphobic polymer comprises a polysiloxane polymer, such as a homopolymer, copolymer, etc. The polysiloxane can be a polydialkylsiloxane. For example, the polysiloxane can include —$Si(R_1R_2)$—O— repeat units, such as where $R_1$ and $R_2$ independently can be $C_1$-$C_{12}$ linear or branched saturated or unsaturated alkyl groups (and/or fluoroalkyl groups as described above), $C_4$-$C_{12}$ saturated or unsaturated cycloalkyl groups, unsubstituted aromatic groups, or substituted aromatic groups. Selection of $R_1$ and $R_2$ as methyl groups corresponds to a polydimethylsiloxane (PDMS). In a particular refinement, the omniphobic polymer can be a polysiloxane with a relatively high glass transition temperature ($T_g$), for example with $R_1$ and/or $R_2$ including a relatively rigid group to increase $T_g$. The glass transition temperature can be 60° C. or less, or 70° C. or less. For example the glass transition temperature can be in a range from –150° C. to 60° C. or 70° C., such as at least –150° C., –100° C., –50° C., 0° C., 10° C., or 20° C. and/or up to 0° C., 20° C., 40° C., 50° C., 60° C., or 70° C. Relatively rigid groups for $R_1$ and/or $R_2$ can include cycloalkyl and aromatic groups noted above. In another particular refinement, the omniphobic polymer can be a polysiloxane in which at least some $R_1$ and/or $R_2$ include unsaturated C═C groups which are amenable to UV crosslinking, for example during curing to form the thermoset polymer. Such increased crosslinking can help to increase the hardness and improve the dirt repellency of the coating. For example, the polysiloxane can include 3-30 mol. % unsaturated alkyl groups from among the total $R_1$ and $R_2$ groups in the polysiloxane (e.g., at least 3, 5, 10, or 15 mol. % and/or up to 15, 20, 25, or 30 mol. %).

In a refinement, the at least one filler is silicon dioxide, such as a silicon dioxide nanofiller (e.g., silica or nano-silica). In various embodiments, other fillers, nanofillers, or additives can be present, but at least one of the fillers or nanofillers is a silica. Other particularly suitable nanofillers include nanoclays, for example organomodified nanoclays. In an embodiment, the thermoset omniphobic composition can include any suitable organic or inorganic filler or additive, which can be included to improve one or more of mechanical properties, anti-dirt, electrical properties, and omniphobic properties of the final composition. Such additives can be in addition to those noted for the filler or nanofiller component, which generally have hydrophobic character. For example, the additional additives can include biocides, pigments, dyes, a thermoplastic material, or a combination thereof. The additional additives can be added in the range from 0.01 wt. % to 10 wt. %, for example in range from 1 wt. % to 5 wt. %. Total filler content, including the fillers or nanofillers to improve hydrophobic/anti-dirt properties and the additional fillers or additives, can be up to 50 wt. %, for example 5-50 wt. %. The presence of organic or inorganic fillers or additives in the omniphobic composition can affect the clarity of the resulting composition, in which case the amount and size of the fillers or additives can be selected in view of the desired clarity properties of the composition as well as the mechanical, electrical, omniphobic or other functional properties of the final composition.

In a refinement, the at least one omniphobic filler or nanofiller is ethylenic-functional. The omniphobic filler or nanofiller can be derivatized or otherwise modified to include at least some ethylenic-functional (e.g., (meth)acrylate) functional surface groups, which in turn can promote compatibility/dispersibility with the other ethylenic components forming the thermoset polymer prior to polymerization as well as provide a means for reaction and covalently attaching the omniphobic filler or nanofiller to the thermoset polymer matrix. For example, silanol (e.g., —SiOH) surface groups on silicon-containing fillers or nanofillers (e.g., nanosilica) can be reacted with a (meth)acrylic trialkoxy including ethylenic-functionality to incorporate corresponding ethylenic-functional surface groups into the omniphobic filler or nanofiller via sol-gel chemistry. In other embodiments, the omniphobic filler or nanofiller is not modified or does not otherwise contain ethylenic-functional functional surface groups (e.g., being used in its natural form).

In a refinement, the at least one filler is a nanofiller, for example having a size of 80 nm or less, or 40 nm or less. Nanofillers having a small size of 80, 60, or 40 nm or less can be selected when it is desirable to have an optically clear thermoset omniphobic composition or coating, whereas larger nanofillers can result in a cloudy or otherwise opaque appearance. In such cases, the nanofillers suitably can have a size of at least 1, 2, 5, or 10 nm and/or up to 15, 20, 30, 40, 60, or 80 nm. The sizes can correspond to average sizes or size ranges (e.g., minimum and maximum sizes, for example a d10-d90 range), for example based on a number, weight, area, or volume distribution. The sizes can similarly correspond to an approximate or equivalent diameter (e.g., for a roughly or substantially spherical particle), an approximate or equivalent maximum length (e.g., for a roughly or substantially rod or tubular particle), or an approximate or equivalent maximum width (e.g., for a roughly or substantially plate-like particle).

In a refinement, the at least one filler has a size of 5000 nm or 1000 nm or less. Fillers having a size above 40 nm or above 80 nm can be selected when optically clarity is not a desired feature of the thermoset omniphobic composition or coating. In such cases, the fillers suitably can have a size of at least 40, 80, 120, 200, or 400 nm and/or up to 200, 400, 600, 1000, 2000, or 5000 nm. The sizes can likewise correspond to average sizes or size ranges, etc., as described above.

In a refinement, the thermoset polymer and the omniphobic polymer are present in the thermoset omniphobic composition in a combined amount ranging from 50 wt. % to 95 wt. % or 99 wt. %; and the at least one omniphobic filler or nanofiller is present in the thermoset omniphobic composition in an amount ranging from 1 wt. % or 5 wt. % to 50 wt. %. Suitably, the thermoset polymer and the omniphobic polymer together can be at least 50, 60, 70, or 80 wt. % and/or up to 70, 80, 90, 95, 98, or 99 wt. % of the thermoset omniphobic composition. Alternatively or additionally, the at least one filler or nanofiller can be at least 1, 2, 5, 10, 15, 20, or 30 wt. % and/or up to 10, 20, 30, 40, or 50 wt. % of the thermoset omniphobic composition. Alternatively or additionally, at least 90, 95, 98, 98, 99, or 99.9 wt. % of the thermoset omniphobic composition is the thermoset polymer, the omniphobic polymer, and the filler or nanofiller(s) combined (e.g., 0.05, 0.1, 0.5, 1, 2, 5, or 10 wt. % of other additives or components besides the thermoset polymer, the omniphobic polymer, and the omniphobic filler or nanofiller(s)).

In a refinement, the ethylenic-polyfunctional first monomer is present in the thermoset polymer in an amount ranging from 5 wt. % to 95 wt. %. Suitably, the ethylenic-polyfunctional first monomer can be at least 5, 10, 15, 20, 30, 40, or 50 wt. % and/or up to 30, 50, 70, 80, 90, or 95 wt. % of the of the thermoset polymer. Alternatively or additionally, the ethylenic-polyfunctional first monomer can be at least 2, 5, 10, 15, 20, 30, or 40 wt. % and/or up to 20, 40, 60, 70, 80, or 90 wt. % of the of the thermoset omniphobic composition as a whole. Relatively higher amounts are suitable when the ethylenic-functional second monomer is absent, and, correspondingly, relatively lower amounts are suitable when the ethylenic-functional second monomer is present. The concentrations can correspond to the amount of monomer included and reacted in a reaction mixture to form the thermoset polymer, or they equivalently can correspond to the amount of the monomer unit as incorporated into the final thermoset polymer. The foregoing ranges additionally can correspond to the amount of the ethylenic-polyfunctional first monomer relative to the combined amount of thermoset polymer and omniphobic polymer (e.g., when the omniphobic polymer is blended with the thermoset polymer but not covalently incorporated into the thermoset polymer).

In a refinement, the ethylenic-functional second monomer is present in the thermoset polymer in an amount ranging from 30 wt. % to 95 wt. %. In embodiments where it is included in the thermoset polymer, the ethylenic-functional second monomer suitably can be at least 30, 40, 50, 60, or 70 wt. % and/or up to 50, 70, 80, 90, or 95 wt. % of the of the thermoset polymer. Alternatively or additionally, the ethylenic-functional second monomer can be at least 20, 30, 40, 50, or 60 wt. % and/or up to 40, 60, 70, 80, or 90 wt. % of the of the thermoset omniphobic composition as a whole. The concentrations can correspond to the amount of monomer included and reacted in a reaction mixture to form the thermoset polymer, or they equivalently can correspond to the amount of the monomer unit as incorporated into the final thermoset polymer. The foregoing ranges additionally can correspond to the amount of the ethylenic-functional second monomer relative to the combined amount of thermoset polymer and omniphobic polymer (e.g., when the omniphobic polymer is blended with the thermoset polymer but not covalently incorporated into the thermoset polymer).

In a refinement, the omniphobic polymer is present in the thermoset omniphobic composition in an amount ranging from 0.1 wt. % to 10 wt. %. Suitably, the omniphobic polymer can be at least 0.1, 0.2, 0.5, 1, 2, 3, 4, or 5 wt. % and/or up to 2, 4, 6, 7, 8, or 10 wt. % of the of the thermoset omniphobic composition as a whole. Alternatively or additionally, the omniphobic polymer can be at least 0.2, 0.5, 1, 1.5, 2, 3, 4, or 5 wt. % and/or up to 3, 5, 7, 8, 9, or 10 wt. % relative to the combined amount of thermoset polymer and omniphobic polymer.

In a refinement, the composition has a water contact angle in a range from 90° to 179°, for example at least 90° or 95° and/or up to 120°, 130°, 150°, or 179°. In a refinement, the composition has an oil contact angle in a range from 1° to 150°. In a refinement, the composition has a water sliding angle in a range from 1° to 60° for a 75 µl droplet. In a refinement, the composition has an oil sliding angle in a range from 1° to 50° for a 10 µl droplet. The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°, 179°; such as for the cured composition as a coating). In some cases, the water contact angle can be up to about 125° for non-smooth or rough surfaces. In an embodiment, the composition has an oil contact angle in a range from 0° or 1° to 150° (e.g., at least 1°, 10°, 20°, or 30° and/or up to 40°, 50°, 60°, or 65°, 100°, or 150°; such as for the cured composition as a coating). In an embodiment, the composition has a water sliding angle in a range from 0° or 1° to 60° for a 75 µl droplet (e.g., at least 1°, 2°, 4°, 6°, or 8° and/or up to 10°, 15°, 20°, 30°, or 60°; such as for the cured composition as a coating). In an embodiment, the composition has an oil sliding angle in a range from 0° or 1° to 20° for a 10 µl or 25 µl droplet (e.g., at least 1°, 2°, 4°, 6°, or 8° and/or up to 10°, 12°, 15°, 20°, or 50°; such as for the cured composition as a coating). The contact angles for the omniphobic coatings can be higher when fillers or nanofillers (e.g., clay, silica, etc.) are included in the composition as compared to corresponding compositions without any fillers or nanofillers.

In another aspect, the disclosure relates to a coated article comprising: (a) a substrate; and (b) a thermoset omniphobic composition according to any of the variously disclosed embodiments, coated on a surface of the substrate. The composition can be in the form of a coating or film on an external, environment-facing surface of the substrate (e.g., where the surface would otherwise be exposed to the external environment in the absence of the composition). In this case, the thermoset omniphobic composition provides omniphobic protection to the underlying substrate.

Various refinements of the disclosed coated article are possible.

In a refinement, the substrate is selected from the group of metal, plastics, a different thermoset material, glass, wood, fabric (or textile), and ceramics. The substrate is not particularly limited, and generally can be formed from any material desired for protection with an omniphobic coating, in particular given the good, broad adhesive capabilities of the thermoset omniphobic composition. For example, the substrate can be a metal, plastic, a different thermoset material (e.g., a primer material; material other than the other than thermoset omniphobic composition), glass, wood, fabric (or textile), ceramic material, or a combination thereof. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the thermoset omniphobic composition on the one or more intermediate coatings as the final, external coating on the coated article.

In a refinement, wherein the thermoset omniphobic composition has a thickness ranging from 0.01 µm to 500 µm. The thermoset omniphobic composition can have any desired thickness on the substrate. In common applications, the composition has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate to form even thicker layers of the composition (e.g., above 500 µm or otherwise) if desired.

In a refinement, the thermoset omniphobic composition coating is scratch-resistant, dirt-repellent, and optically clear.

In another aspect, the disclosure relates to a method for forming a thermoset omniphobic composition, the method comprising: (a) providing a reaction mixture comprising: an ethylenic-polyfunctional first monomer; optionally an ethylenic-functional second monomer which is different from the ethylenic-polyfunctional first monomer; an omniphobic polymer; and at least one (hydrophobic) filler such as a nanofiller selected from the group consisting of nanoclay, graphene oxide, graphene, silicon dioxide (silica), aluminum oxide, cellulose nanocrystals, carbon nanotubes, titanium dioxide (titania), diatomaceous earth, and combinations thereof; and (b) curing the reaction mixture to form the thermoset omniphobic composition comprising: a thermoset polymer comprising a polymerization reaction product between the ethylenic-polyfunctional first monomer, and the ethylenic-functional second monomer (when present); the omniphobic polymer; and the at least one filler distributed throughout the thermoset polymer. The reaction mixture is generally a solvent mixture that includes the monomer/polymer components dissolved therein and the filler or nanofiller as a dispersed/suspended phase. The reaction mixture can be cured by any suitable means, such as by application of heat, UV radiation, etc., for example after application of the reaction mixture to a substrate to be coated. The reaction mixture can further include an initiator for curing, for example a photoinitiator for UV curing. Curing the reaction mixture can comprise: applying the reaction mixture to a substrate; and forming a (solidified) coating of the thermoset omniphobic composition on the substrate (e.g., crosslinked monomers, omniphobic polymer, and filler or nanofiller components). The method can comprise performing one or more of spraying, casting, rolling, and dipping to apply the reaction mixture to the substrate.

While the disclosed methods, compositions, and articles are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
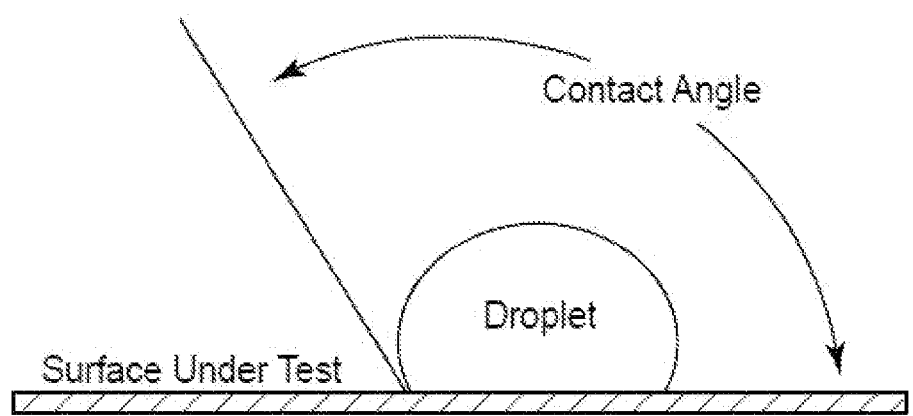
FIG. 1 is a diagram illustrating measurement of a contact angle for a liquid droplet on a surface.
Figure 2:
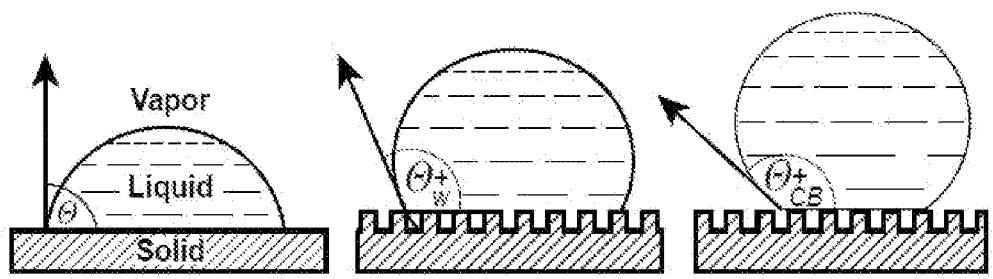
FIG. 2 is a diagram illustrating how contact angles for a given liquid droplet on a surface can vary as a function of surface topology (e.g., flat or smooth surface vs. textured surfaces).

The disclosure relates to a thermoset omniphobic composition with favorable dirt repellency and water resistance properties. The composition can be used as a protective coating on a substrate, for example a glass, metal, polymeric, or other substrate such as for a solar panel, a sensor (e.g., optical window in a sensor), a glass/window panel, an automobile surface (e.g., glass/window, body, etc.). Such coatings, when contacted with soil, dirt, dust, etc., remain clean and transparent. The omniphobic composition generally includes a thermoset polymer, an omniphobic polymer, and a filler or nanofiller. The thermoset polymer can be a crosslinked acrylate or other vinyl polymer, in particular one that is amenable to UV curing. The omniphobic polymer can include fluorocarbon and/or siloxane groups for improving water resistance. The nanofiller can include nanosilica and/or nanoclay. The thermoset polymer and the omniphobic polymer together form a matrix for the filler or nanofiller as a dispersed phase throughout the matrix. A coated substrate with the thermoset omniphobic composition thereon exhibits favorable water contact and sliding angles as well as favorable transparency values in dirt accumulation tests.

Thermoset Omniphobic Composition

The thermoset polymer according to the disclosure is generally a crosslinked polymerization reaction product between one or more ethylenically unsaturated monomers, for example an ethylenic-polyfunctional first monomer and optionally an ethylenic-functional (e.g., poly- or mono-functional) second monomer as well as further optional ethylenic-functional monomers. The first monomer has multiple ethylenic groups to promote crosslinking and thermoset formation during polymerization. The second monomer can have a single ethylenic group to permit incorporation into the thermoset network, or it can have multiple ethylenic groups to further promote crosslinking and thermoset formation during polymerization.

The ethylenic-polyfunctional first monomer is suitably a monomer with 2 or more unsaturated ethylenic groups, for example having at least 2, 3, or 4 and/or up to 2, 4, 6, 8, or 10 ethylenic groups. The ethylenic groups in the various monomers can be represented by C=C groups, for example in (meth)acrylate groups; (meth)acrylamide groups; vinyl groups such as in vinyl aromatics (e.g., divinyl benzene), vinyl acetates (e.g., divinyl acetates), divinyl ethers; and polyfunctional alkene groups at terminal chain positions such as alkyl dienes, trienes, etc. The ethylenic-polyfunctional first monomer suitably has terminal C=C reactive groups, such as a (meth)acrylate or (meth)acrylamide polyfunctional monomer. An example of a suitable (meth)acrylate functional group is $CH_2=CR-C(=O)O-X$. X can independently be selected from hydrogen (H), hydrocarbons containing from 1 to 20 carbon atoms, and heteroatom-substituted (e.g., N-, O-, P-, or S-substituted) hydrocarbons containing from 1 to 20 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. Selection of R as H corresponds to an acrylate/acrylic acid functional group. Selection of R as $CH_3$ corresponds to an methacrylate/methacrylic acid functional group. An example of a suitable (meth)acrylamide functional group is $CH_2=CR-C(=O)NX'-X$, where R and X are as defined above, and X' can be independently selected from the same options as X (e.g., H or otherwise).

An example of a corresponding acrylate-based ethylenic-polyfunctional first monomer is $[CH_2=CR-C(=O)O-]_m-R_a$. The index m can have a value of 2 or more, such as for a poly-functional monomer, for example being at least 2, 3, 4, 6, 8, or 10 and/or up to 3, 4, 6, 8, 10, 12, or 15. The $R_a$ group as an organic core or body portion of the eventual cured thermoset polymer can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms. More generally, the ethylenic-polyfunctional first monomer can be an ester reaction product between (for example) an acrylic acid compound (e.g., $CH_2=CR-C(=O)OH$ with R as defined above) and a polyol, such as a polyol having 2, 3, or 4 hydroxyl groups on aromatic, alicyclic, and/or aliphatic groups having at least 2, 4, 6, or 10 and/or up to 4, 8, 12, 16, or 20 carbon atoms. For example, the ethylenic-polyfunctional first monomer can include one or more of 1,6-hexanediol diacrylate (HDDA), 1,4-butane diol diacrylate (BDDA), 1,6-hexanediol dimethyl acrylate (HDMDA), 1,4-benzenediol dimethyl acrylate (BDMDA), trimethylolpropane triacrylate (TMPTA), trimethylolpropane formalacrylate, dipropylene glycol diacrylate (DPGDA), and pentaerythritol triacrylate (PETIA). Other suitable first monomers more generally can include mono-, di-, tri-, tetra-, and polyethyleneglycol diacrylates and dimethacylates; alkane diol diacrylates and dimethacylates such as based on 1,6-hexanediol, 1,4-butane diol, 1,3-butane diol, 1,5-pentanediol, 1,9-nonane diol, and 1,10-decanediol; allyl methacrylate; N,N-diallylacrylamide; and methylenebisacrylamide. Similarly, an example of a corresponding acrylamide-based ethylenic-polyfunctional first monomer is [CH$_2$=CR—C(=O)NX'—]$_m$—R$_a$, where R, R$_a$, and X' are as defined above.

The ethylenic-functional second monomer is an optional component of the thermoset polymer, but it suitably is included to control/adjust mechanical properties, chemical properties, and/or degree of crosslinking of the thermoset polymer. When included, the ethylenic-functional second monomer is suitably a monomer with 1 or more, preferably only 1, unsaturated ethylenic group, for example having at least 1, 2, 3, or 4 and/or up to 2, 4, 6, 8, or 10 ethylenic groups, which can be a (meth)acrylate group, (meth)acrylamide group, vinyl group, or other terminal alkene group as noted above. An example of a suitable (meth)acrylate functional group for the second monomer is CH$_2$=CR—C(=O)O— (or CH$_2$=CR—C(=O)O—X) as described above for the first monomer, although the selection for R and/or X can be same or different from those as between the ethylenic-functional second monomer and the ethylenic-polyfunctional first monomer. An example of a corresponding acrylate-based ethylenic-functional second monomer is CH$_2$=CR—C(=O)O—R$_2$. The R$_2$ group can include hydrocarbons containing from 1 to 50 carbon atoms, and heteroatom-substituted (e.g., N-, O-, P-, or S-substituted) hydrocarbons containing from 1 to 50 carbon atoms. The hydrocarbons and heteroatom-substituted hydrocarbons can be linear, branched, and/or cyclic, aliphatic and/or aromatic, saturated and/or unsaturated, etc., for example having at least 1, 2, 3, 4, 6, 8, 10, or 20 and/or up to 2, 4, 6, 8, 10, 15, 20, 30, 40, or 50 carbon atoms. An example of a suitable (meth)acrylamide functional group for the second monomer is CH$_2$=CR—C(=O)NX'— (or CH$_2$=CR—C(=O)NX'—X) as described above for the first monomer, although the selection for R, X, and/or X' can be same or different from those as between the ethylenic-functional second monomer and the ethylenic-polyfunctional first monomer. Likewise, an example of a corresponding acrylamide-based ethylenic-functional second monomer is CH$_2$=CR—C(=O)NX'—R$_2$, where R, R$_2$, and X' are as defined above.

The ethylenic-functional second monomer suitably includes highly non-polar monomers with high boiling point and good rigidity. The high boiling point prevents the monomers from evaporating during UV curing, while high rigidity impart physical hardness for good anti-dirt properties. Rigidity can be based on the inclusion of aliphatic or aromatic cyclic or heterocyclic units in the monomer. The ethylenic-functional second monomer generally includes any monomers that are polymerizable or copolymerizable via free-radical polymerization. An example formula can include CH$_2$=CHR where R is phenyl or other aromatic as in styrene, a nitrile as in acrylonitrile, a halogen as in vinyl chloride, an acetate as in vinyl acetate, an ether as in a vinyl ether, a linear or cyclic (hetero)alkyl group as in a 1-alkene, an ester as in an acrylate, and an amide as in an acrylamide. Another example formula can include CH$_2$=CRR', such as where R is methyl and R' is ester as in methyl methacrylate. Examples of suitable ethylenic-functional second monomers include one or more of isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl)benzotriazole, phenyl methacrylate, 2-phenylethyl acrylate, 2-phenylethyl methacrylate, phenyl acrylate, cinnamyl methacrylate, and benzyl acrylate.

The omniphobic polymer is generally a polymer, for example a copolymer, with one or more omniphobic groups such as fluorinated groups, siloxane groups, etc. which can impart water repellency and omniphobic or hydrophobic character to the overall thermoset omniphobic composition. In an embodiment, the omniphobic polymer is free or substantially free of available acrylate or other ethylenic polymerizable groups, for example with such groups either being not initially present in or having been reacted/consumed from their respective monomers during formation of the omniphobic polymer. In such case, the omniphobic polymer generally forms a physical blend with the thermoset matrix, and the omniphobic polymer does not react with or is not otherwise covalently bonded to the thermoset network. In another embodiment, the omniphobic polymer can be an ethylenic-functional omniphobic polymer having 1 or more unsaturated ethylenic groups, for example having at least 1, 2, 3, or 4 and/or up to 2, 4, 6, 8, or 10 ethylenic groups, which can be a (meth)acrylate group, (meth)acrylamide group, vinyl group, or other terminal alkene group as described above. The additional ethylenic-functionality can result from inclusion of a polyfunctional comonomer when forming the omniphobic polymer and prior to forming the thermoset polymer. In this case, the ethylenic-functionality of the omniphobic polymer can react with the ethylenic-polyfunctional first monomer and the ethylenic-functional second monomer (when present) such that the omniphobic polymer becomes covalently bonded component of the thermoset polymer and corresponding matrix.

In an embodiment, the omniphobic polymer is a copolymer between an ethylenic-functional omniphobic third monomer and an ethylenic-functional fourth monomer different from the third monomer. The omniphobic polymer suitably includes 5-80 wt. % or 20-40 wt. % third monomer and 20-95 wt. % or 60-80 wt. % fourth monomer, for example with not more than 10, 5, 2, or 1 wt. % of other comonomers or components besides the third and fourth monomers. The ethylenic-functional third and fourth monomers are suitably monomers with 1 or more, preferably only 1, unsaturated ethylenic groups, for example having at least 1, 2, 3, or 4 and/or up to 2, 4, 6, 8, or 10 ethylenic groups, which can be (meth)acrylate groups, (meth)acrylamide groups, or otherwise.

The omniphobic third monomer includes one or more omniphobic functional groups, for example fluorocarbon groups, siloxane groups, etc. Example omniphobic functional groups include perfluorinated carbon atoms, for example having at least 2, 3, 4, 6, or 8 and/or up to 4, 8, 12, 16, or 20 perfluorinated carbon atoms in a given omniphobic third monomer. Examples of perfluorinated carbon atoms include —CF$_3$ at an omniphobic chain terminus, —CF$_2$— along an omniphobic chain, and a combination of —(CH$_2$)$_n$(CF$_2$)$_m$CF$_3$ along an omniphobic chain, for example where the chain can be branched or linear. Other example omniphobic functional groups include siloxane repeat units, for example having at least 2, 3, 4, 6, or 8 and/or up to 4, 8, 12, 16, 20, 50, or 100 siloxane repeat units in a given omniphobic third monomer. Examples of siloxane repeat include Si(R$_1$R$_2$)—O— repeat units, where R$_1$ and R$_2$ independently can be C$_1$-C$_{12}$ linear or branched alkyl groups (and/or fluoroalkyl groups as described above), C$_4$-C$_{12}$ cycloalkyl groups, unsubstituted aromatic groups, or substituted aromatic groups, in particular where R$_1$ and R$_2$ are methyl groups. Other example omniphobic functional groups include fluorosiloxane repeat units, such as including Si(R$_1$R$_2$)—O— repeat units as above, but with partially or fully fluorinated analogs of the R$_1$ and R$_2$ group, for example including perfluorinated carbon atoms.

In an embodiment, the ethylenic-functional omniphobic third monomer can include a fluorinated acrylate ester. For example, the third monomer can be an ester reaction product between (for example) an acrylic acid compound (e.g., $CH_2=CR-C(=O)OH$ with R as defined above) and a fluorinated alcohol, such as an alcohol having at least 2, 3, 4, 6, or 8 and/or up to 4, 8, 12, 16, or 20 perfluorinated carbon atoms on aromatic, alicyclic, and/or aliphatic groups having at least 2, 4, 6, or 10 and/or up to 4, 8, 12, 16, or 20 carbon atoms. An example of a corresponding fluorinated acrylate ester is $CH_2=CR-C(=O)O-R_3$. The $R_3$ group can include fluorinated hydrocarbons containing from 2 to 50 carbon atoms, and heteroatom-substituted (e.g., N-, O-, P-, or S-substituted) hydrocarbons containing from 2 to 50 carbon atoms. The hydrocarbons and heteroatom-substituted hydrocarbons can be linear, branched, and/or cyclic, aliphatic and/or aromatic, saturated and/or unsaturated, etc., for example having at least 2, 3, 4, 6, 8, 10, or 20 and/or up to 2, 4, 6, 8, 10, 15, 20, 30, 40, or 50 carbon atoms total and at least 2, 3, 4, 6, or 8 and/or up to 4, 8, 12, 16, or 20 perfluorinated carbon atoms. An example of a suitable fluorinated alcohol is $CF_3(CF_2)_n(CH_2)_2OH$, in which case the corresponding $R_3$ group is $CF_3(CF_2)_n(CH_2)_2-$ (i.e., with n+1 perfluorinated carbon atoms). Similarly, the third monomer can be an acrylamide-based fluorinated analog such as $CH_2=CR-C(=O)NX'-R_3$, where R, $R_3$, and X' are as defined above.

In a particular embodiment, the ethylenic-functional second monomer is present in the thermoset polymer, and the ethylenic-functional fourth monomer is the same as the ethylenic-functional second monomer. The ethylenic-functional fourth monomer suitably is a (meth)acrylate mono-functional monomer or a (meth)acrylamide mono-functional monomer. The ethylenic-functional fourth monomer generally can be as described above for the ethylenic-functional second monomer where the second and fourth monomers can be the same or different. Suitably, the second and fourth monomers can be selected to be the same to promote compatibility between the omniphobic polymer and the eventual thermoset polymer matrix, both of which include shared functional groups. Examples of suitable ethylenic-functional fourth monomers include isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl)benzotriazole, phenyl methacrylate, 2-phenylethyl acrylate, 2-phenylethyl methacrylate, phenyl acrylate, cinnamyl methacrylate, and benzyl acrylate. In some embodiments, the omniphobic polymer can include less reactive internal alkene groups (e.g., non-terminal $-C=C-$ groups), which do not significantly interfere with the free radical polymerization used to make the omniphobic polymer, but which can form a chemical bond with the thermoset polymer matrix in the UV crosslinking stage.

In an embodiment, the omniphobic polymer can be a polysiloxane polymer, such as a homopolymer, copolymer, etc. The polysiloxane can be a polydialkylsiloxane. For example, the polysiloxane can include $-Si(R_1R_2)-O-$ repeat units, such as where $R_1$ and $R_2$ independently can be $C_1$-$C_{12}$ linear or branched saturated or unsaturated alkyl groups (and/or fluoroalkyl groups as described above), $C_4$-$C_{12}$ saturated or unsaturated cycloalkyl groups, unsubstituted aromatic groups, or substituted aromatic groups. Selection of $R_1$ and $R_2$ as methyl groups corresponds to a polydimethylsiloxane (PDMS). In a particular refinement, the omniphobic polymer can be a polysiloxane with a relatively high glass transition temperature ($T_g$), for example with $R_1$ and/or $R_2$ including a relatively rigid group to increase $T_g$. The glass transition temperature can be 60° C. or less, or 70° C. or less. For example the glass transition temperature can be in a range from −150° C. to 60° C. or 70° C., such as at least −150° C., −100° C., −50° C., 0° C., 10° C., or 20° C. and/or up to 0° C., 20° C., 40° C., 50° C., 60° C., or 70° C. Relatively rigid groups for $R_1$ and/or $R_2$ can include cycloalkyl and aromatic groups noted above. In another particular refinement, the omniphobic polymer can be a polysiloxane in which at least some $R_1$ and/or $R_2$ include unsaturated C=C groups which are amenable to UV crosslinking, for example during curing to form the thermoset polymer. Such increased crosslinking can help to increase the hardness and improve the dirt repellency of the coating. For example, the polysiloxane can include 3-30 mol. % unsaturated alkyl groups from among the total $R_1$ and $R_2$ groups in the polysiloxane, for example at least 3, 5, 10, or 15 mol. % and/or up to 15, 20, 25, or 30 mol. %.

The filler helps to improve or impart anti-dirt properties to the thermoset omniphobic composition. The filler can generally include one or more of nanoclay, graphene oxide, graphene, silicon dioxide (silica), aluminum oxide, cellulose nanocrystals, carbon nanotubes, titanium dioxide (titania), and diatomaceous earth. In an embodiment, the filler includes silicon dioxide, such as a silicon dioxide nanofiller (e.g., silica or nanosilica). In various embodiments, other fillers, nanofillers, or additives can be present, but at least one of the fillers or nanofillers is a silica. Other particularly suitable nanofillers include nanoclays, for example organo-modified nanoclays.

The filler can have any suitable size, for example having a characteristic dimension on the nanoscale (e.g., a nanofiller), a characteristic dimension on the microscale, etc. In an embodiment, the filler can be or otherwise include a nanofiller, for example having a size of 80 nm or less, or 40 nm or less. Nanofillers having a small size of 80, 60, or 40 nm or less can be selected when it is desirable to have an optically clear thermoset omniphobic composition or coating, whereas larger nanofillers can result in a cloudy or otherwise opaque appearance. In such cases, the nanofillers suitably can have a size of at least 1, 2, 5, or 10 nm and/or up to 15, 20, 30, 40, 60, or 80 nm. The sizes can correspond to average sizes or size ranges (e.g., minimum and maximum sizes, for example a d10-d90 range), for example based on a number, weight, area, or volume distribution. The sizes can similarly correspond to an approximate, hydraulic, or equivalent diameter (e.g., for a roughly or substantially spherical particle), an approximate or equivalent maximum length (e.g., for a roughly or substantially rod or tubular particle), or an approximate or equivalent maximum width (e.g., for a roughly or substantially plate-like particle). In another embodiment, the filler can have larger sizes up to 5000 nm or 1000 nm or less. Fillers having a size above 40 nm or above 80 nm can be selected when optically clarity is not a desired feature of the thermoset omniphobic composition or coating. In such cases, the fillers suitably can have a size of at least 40, 80, 120, 200, or 400 nm and/or up to 200, 400, 600, 1000, 2000, or 5000 nm. The sizes can likewise correspond to average sizes or size ranges, etc., as described above.

In an embodiment, the thermoset omniphobic composition can include any suitable additional organic or inorganic filler or additive, which can be included to improve one or more of mechanical properties, anti-dirt, electrical properties, and omniphobic properties of the final composition. Such additives can be in addition to those noted for the filler or nanofiller component, which generally have hydrophobic character. For example, the additional additives can include biocides, pigments, dyes, a thermoplastic material, or a combination thereof. The additional additives can be added in the range from 0.01 wt. % to 10 wt. %, for example in range from 1 wt. % to 5 wt. %. Total filler content, including the fillers or nanofillers to improve hydrophobic/anti-dirt properties and the additional fillers or additives, can be up to 50 wt. %, for example 5-50 wt. %. The presence of organic or inorganic fillers or additives in the omniphobic composition can affect the clarity of the resulting composition, in which case the amount and size of the fillers or additives can be selected in view of the desired clarity properties of the composition as well as the mechanical, electrical, omniphobic or other functional properties of the final composition.

In an embodiment, the at least one omniphobic filler or nanofiller is ethylenic-functional. The omniphobic filler or nanofiller can be derivatized or otherwise modified to include at least some ethylenic-functional (e.g., (meth)acrylate) functional surface groups, which in turn can promote compatibility/dispersibility with the other ethylenic components forming the thermoset polymer prior to polymerization as well as provide a means for reaction and covalently attaching the omniphobic filler or nanofiller to the thermoset polymer matrix. For example, silanol (e.g., —SiOH) surface groups on silicon-containing fillers or nanofillers (e.g., nanosilica) can be reacted with a (meth)acrylic trialkoxy including ethylenic-functionality to incorporate corresponding ethylenic-functional surface groups into the omniphobic filler or nanofiller via sol-gel chemistry. In other embodiments, the omniphobic filler or nanofiller is not modified or does not otherwise contain ethylenic-functional functional surface groups (e.g., being used in its natural form).

The thermoset omniphobic composition can include its thermoset polymer, omniphobic polymer, and filler components in any suitable relative proportions, for example depending on the desired end use of the composition as a coating for a particular application. In an embodiment, the thermoset polymer and the omniphobic polymer can be present in the thermoset omniphobic composition in a combined amount ranging from 50 wt. % to 95 wt. % or 99 wt. %, and the at least one omniphobic filler or nanofiller can be present in the thermoset omniphobic composition in an amount ranging from 1 wt. % or 5 wt. % to 50 wt. %. Suitably, the thermoset polymer and the omniphobic polymer together can be at least 50, 60, 70, or 80 wt. % and/or up to 70, 80, 90, 95, 98, or 99 wt. % of the thermoset omniphobic composition. Alternatively or additionally, the at least one filler or nanofiller can be at least 1, 2, 5, 10, 15, 20, or 30 wt. % and/or up to 10, 20, 30, 40, or 50 wt. % of the thermoset omniphobic composition. Alternatively or additionally, at least 90, 95, 98, 98, 99, or 99.9 wt. % of the thermoset omniphobic composition is the thermoset polymer, the omniphobic polymer, and the filler or nanofiller(s) combined, for example having up to 0.05, 0.1, 0.5, 1, 2, 5, or 10 wt. % at most of other additives or components besides the thermoset polymer, the omniphobic polymer, and the omniphobic filler or nanofiller(s). In an embodiment, the omniphobic polymer individually can be present in the thermoset omniphobic composition in an amount ranging from 0.1 wt. % to 10 wt. %. Suitably, the omniphobic polymer can be at least 0.1, 0.2, 0.5, 1, 2, 3, 4, or 5 wt. % and/or up to 2, 4, 6, 7, 8, or 10 wt. % of the of the thermoset omniphobic composition as a whole. Alternatively or additionally, the omniphobic polymer can be at least 0.2, 0.5, 1, 1.5, 2, 3, 4, or 5 wt. % and/or up to 3, 5, 7, 8, 9, or 10 wt. % relative to the combined amount of thermoset polymer and omniphobic polymer.

In an embodiment, the ethylenic-polyfunctional first monomer is present in the thermoset polymer in an amount ranging from 5 wt. % to 95 wt. %. Suitably, the ethylenic-polyfunctional first monomer can be at least 5, 10, 15, 20, 30, 40, or 50 wt. % and/or up to 30, 50, 70, 80, 90, or 95 wt. % of the of the thermoset polymer. Alternatively or additionally, the ethylenic-polyfunctional first monomer can be at least 2, 5, 10, 15, 20, 30, or 40 wt. % and/or up to 20, 40, 60, 70, 80, or 90 wt. % of the of the thermoset omniphobic composition as a whole. Relatively higher amounts are suitable when the ethylenic-functional second monomer is absent, and, correspondingly, relatively lower amounts are suitable when the ethylenic-functional second monomer is present. The concentrations can correspond to the amount of monomer included and reacted in a reaction mixture to form the thermoset polymer, or they equivalently can correspond to the amount of the monomer unit as incorporated into the final thermoset polymer or thermoset omniphobic composition. The foregoing ranges additionally can correspond to the amount of the ethylenic-polyfunctional first monomer relative to the combined amount of thermoset polymer and omniphobic polymer, such as when the omniphobic polymer is blended with the thermoset polymer but not covalently incorporated into the thermoset polymer.

In embodiments including the ethylenic-functional second monomer, the second monomer can be present in the thermoset polymer in an amount ranging from 30 wt. % to 95 wt. %. For example, the ethylenic-functional second monomer suitably can be at least 30, 40, 50, 60, or 70 wt. % and/or up to 50, 70, 80, 90, or 95 wt. % of the of the thermoset polymer. Alternatively or additionally, the ethylenic-functional second monomer can be at least 20, 30, 40, 50, or 60 wt. % and/or up to 40, 60, 70, 80, or 90 wt. % of the of the thermoset omniphobic composition as a whole. The concentrations can correspond to the amount of monomer included and reacted in a reaction mixture to form the thermoset polymer, or they equivalently can correspond to the amount of the monomer unit as incorporated into the final thermoset polymer or thermoset omniphobic composition. The foregoing ranges additionally can correspond to the amount of the ethylenic-functional second monomer relative to the combined amount of thermoset polymer and omniphobic polymer, such as when the omniphobic polymer is blended with the thermoset polymer but not covalently incorporated into the thermoset polymer.

The omniphobic properties of the thermoset omniphobic composition (e.g., for the cured composition) can be characterized in terms of one or more contact angles and/or sliding angles for water and/or oil droplets (e.g., vegetable oil and/or hexadecane) on the thermoset omniphobic composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oilسliding angle in a range from 0° or 1° to 20° for a 10 µl or 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

The dirt-repellent properties of the thermoset omniphobic composition (e.g., for the cured composition) can be characterized by the transmittance (% T) for the thermoset omniphobic composition (e.g., as a coating on a substrate). The following ranges are representative of compositions according to the disclosure which display favorable omniphobic properties. In an embodiment, the composition has a transmittance (% T) of at least 90, 92, 95, 98, or 99% and/or up to 95, 98, 99, 99.5, or 100%. The transmittance suitably is determined as described in the examples below using a coated test slide (e.g., glass slide) and using a reference standard test dust, such as A1, A2, A3, or A4 test dust.

Figure 3:
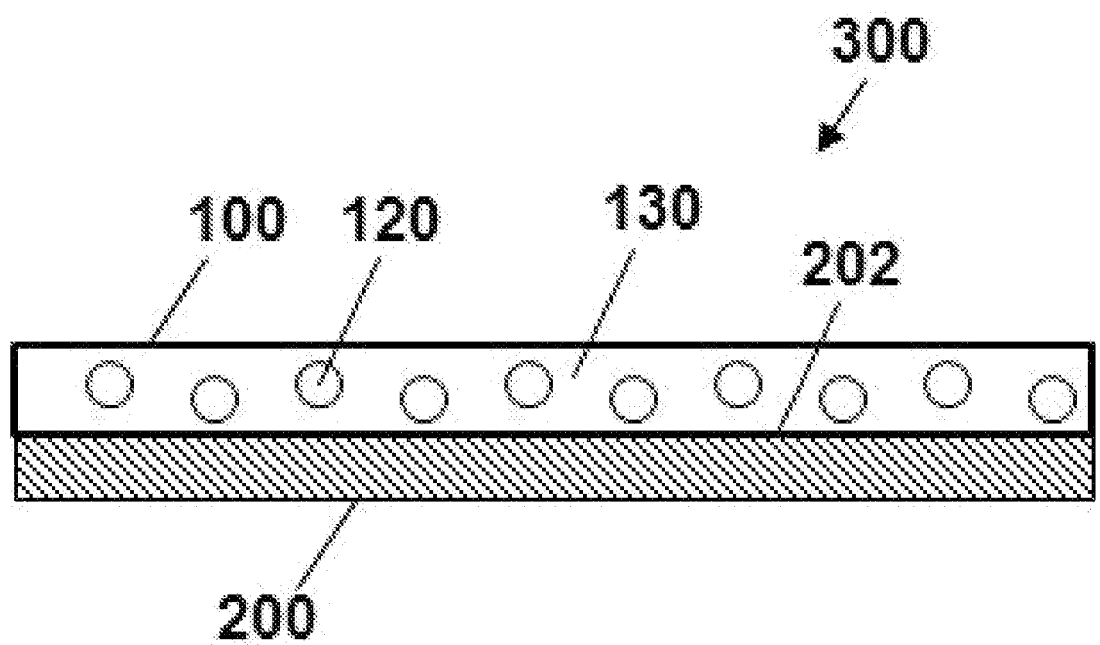
FIG. 3 illustrates a coated article according to the disclosure.

In an embodiment, the thermoset omniphobic composition 100 has a composite structure as illustrated in FIG. 3. The thermoset polymer and omniphobic polymer together can form a continuous matrix phase 130 in which the fillers or nanofillers are present as a dispersed phase 120 distributed throughout the matrix 130. As described herein, in some embodiments, the omniphobic polymer can be (physically) blended with the thermoset polymer to form the matrix 130. In other embodiments, the omniphobic polymer can be covalently bonded to the thermoset polymer to form part of the network matrix 130.

The thermoset omniphobic composition according to the disclosure generally can be formed by providing a reaction mixture including the ethylenic-polyfunctional first monomer, optionally the ethylenic-functional second monomer which is different from the ethylenic-polyfunctional first monomer, the omniphobic polymer (e.g., having been previously separately polymerized or otherwise formed), and the filler or nanofiller. The reaction mixture is then cured to induce free-radical polymerization and crosslinking between the ethylenically unsaturated monomers and/or polymers in the reaction mixture, such as the first monomer, second monomer (when present), and the omniphobic polymer (when it includes an ethylenically unsaturated group). Curing of the reaction mixture forms the corresponding thermoset omniphobic composition with thermoset polymer reaction product, the omniphobic polymer, and the distributed throughout the thermoset omniphobic composition (e.g., a matrix of thermoset polymer and omniphobic polymer). The reaction mixture is generally a solvent mixture that includes the monomer/polymer components dissolved therein and the filler or nanofiller as a dispersed/suspended phase. Examples of suitable reaction solvents include one or more of an aprotic organic solvent such as acetone, tetrahydrofuran, 2-butanone, other ketones (e.g., methyl n-propyl ketone, methyl isobutyl ketone, methyl ethyl ketone, ethyl n-amyl ketone), esters (e.g., $C_1$-$C_4$ alkyl esters of $C_1$-$C_4$ carboxylic acids, such as methyl, ethyl, n-propyl, butyl esters of acetic acid such as n-butyl acetate, etc., n-butyl propionate, ethyl 3-ethoxy propionate), dimethylformamide, dimethyl carbonate, etc. The reaction mixture can be cured by any suitable means, such as by application of heat, UV radiation, etc., for example after application of the reaction mixture to a substrate to be coated. The reaction mixture can further include an initiator for curing, for example a photoinitiator for UV curing as are generally known in the art. Curing by heating (e.g., in an oven, with exposure to a heat lamp, etc.) can be performed at a temperature from 60° C., 80° C. or 100° C. to 140° C. or 180° C. and/or for a time from 0.1, 0.2, 0.5, or 1 hr to 6, 12 or 24 hr.

Coated Article

FIG. 3 illustrates an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200. The coated article 300 can be formed, for example, by applying the reaction mixture described above to the substrate 200, and then curing the reaction mixture on the substrate 200 to form a (solidified) coating of the composition 100 (e.g., crosslinked monomers, omniphobic polymer, and filler or nanofiller components) on the substrate 200. The reaction mixture can be applied to the substrate by any suitable method, for example by spraying, casting, rolling, dipping, etc.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 μm to 500 μm, for example at least 0.01, 10, 20, 50, or 100 μm and/or up to 200, 500 μm. Typical cast coatings can have thicknesses of 10 μm to 100 μm. Typical spin coatings can have thicknesses of 0.05 μm or 0.10 μm to 0.20 μm or 0.50 μm. Multiple coating layers can be applied to substrate 200 to form even thicker layers of the composition 100 (e.g., above 500 μm or otherwise) if desired.

EXAMPLES

The following examples illustrate the disclosed compositions and methods, but are not intended to limit the scope of any claims thereto. In the following examples, thermoset omniphobic compositions generally according to the disclosure are prepared and applied as a film or coating on a test substrate such as glass. The applied films or coatings can then be evaluated according to a variety of tests as described below in order to characterize their relative degree of omniphobicity.

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 179° (e.g., at least 90°, 95°, 100°, or 105° and/or up to 110°, 115°, 120°, or 179°). Suitably, (cured) omniphobic composition coatings according to the disclosure have an oil contact angle in a range from 0° or 1° to 150° (e.g., at least 1°, 10°, 20°, or 30° and/or up to 40°, 50°, 60°, 65° or 150°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 50° (e.g., at least 1°, 2°, 4°, 6°, or 8° and/or up to 10°, 15°, 20°, 30° or 50°). Suitably, (cured) omniphobic composition coatings according to the disclosure have an oil contact angle in a range from 0° or 1° to 60° (e.g., at least 1°, 2°, 4°, 6°, or 8° and/or up to 10°, 12°, 15°, 20° or 60°).

Scratch Resistance: Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Example 1

Example 1 provides illustrative comparative coatings as well as thermoset omniphobic compositions according to the disclosure in the form of coatings with an acrylate thermoset and fluorinated omniphobic polymer matrix including a nanosilica nanofiller. The example illustrates that the disclosed compositions and coating combine good water repellency with anti-dirt properties as well as excellent clarity and transmittance. Nanosilica is used as a nanofiller to impart anti-dirt properties. The examples use fluoroadditives as an omniphobic polymer to impart water repellency, although polyalkylsiloxanes such as PDMS can be used an omniphobic polymer to impart water repellency as well.

Materials: The following components were used in preparing the thermoset omniphobic compositions and their respective components: hexanediol diacrylate (HDDA) (e.g., as first monomer); isobornyl acrylate (IBOA) (e.g., as second or fourth monomer); 1H,1H-perfluorooctyl methacrylate (PFOA) (e.g., as third monomer); 2,2'-azobis(2-methylpropionitrile) (AIBN); nano-silica (about 20 nm average diameter) dispersed separately in hexanediol diacrylate (nano-CL) (e.g., as filler and first monomer), cyclic trimethylolpropaneformalacrylate (CTFA) (e.g., as first monomer) and trimethylolpropantriacrylate (TMPTA) (at 50 wt % loading) (e.g., as first monomer); tetrahydrofurfuryl acrylate (THFA) (e.g., as second or fourth monomer); dimethylhydroxyacetophenone (DMHAP); and tetrahydrofuran (THF).

Methods: Thermoset omniphobic compositions with anti-dirt properties according to the disclosure were generally formed using a UV-curable matrix (e.g., THFA or IBOA) incorporated along with a fluoroadditive including PFOA, and a nano-silica nanofiller dispersed in HDDA as a cross-linker (nano-CL). Comparative compositions without an omniphobic polymer such as the fluoroadditive were also prepared.

Dirt Accumulation/Repellency Measurements: The dirt repellency of prepared coatings was evaluated by measuring the optical transmittance (% T) after the soiling test. Soiling was performed by covering the surface of the coating with a specific type of dust and allow to slide it from the surface on tilting the sample slide. Various types of dust of different grades were used for the soiling test. The four ISO 12103-1 test dust grades which are ISO test dust & test contaminant products from Power Technology Inc (PTI), i.e., A1 Ultrafine Test Dust, A2 Fine Test Dust, A3 Medium Test Dust and A4 Coarse Test Dust. Soiling was also performed against Road Dust which was collected from various local roadways. The collected Road Dust was mixed and kept under heating in the oven for 24 h following by grinding. The optical transmittance (% T) of soiled samples was evaluated by using Perkin Elmer LAMBDA 25 UV-Vis spectrometer (Shimadzu Corporation, Kyoto, Japan), in which an uncoated glass slide was used as a reference cell. The presented % T values correspond to the wavelength of 540 nm. The increase in optical transmittance (% T) of soiled samples reflected the dirt repellency behavior.

Contact Angle Measurements: Water contact angles (WCAs) were determined as generally described above and using a 590-U1 Goniometer equipped with DROPIMAGE software (Ramé-Hart Instrument Co., Succasunna, New Jersey, USA). Deionized water droplets (10 µL) were placed onto the sample surface and then recorded. The contact angle was measured at three different places on the surface of each sample and the average values were reported.

Sliding Angle Measurements: Sliding angle measurements were determined as generally described above and using a custom-built instrument with an adjustable inclining surface. The sliding angle was determined by placing 80 μL droplets of deionized water on the coating surface. The surface was gradually tilted until the droplet began to slide.

Omniphobic Polymer Additive A: An omniphobic fluoro-additive with PFOA and IBOA was prepared as follows. PFOA fluoroacrylate precursor (20 wt %), IBOA (77 wt %), AIBN initiator (2-3 wt % of adduct) and THF solvent (degassed) were charged together in a high reaction flask under nitrogen atmosphere in a glove box. The reaction flask was kept under stirring overnight on a hot plate at 70° C. The reaction was monitored via proton nuclear magnetic resonance (1H-NMR) spectroscopy. After completion of the reaction, the product was concentrated from the THF solvent by rotary evaporator. The fluoro acrylate content of the reaction product adduct was 20% by weight.

Omniphobic Polymer Additive B: An omniphobic fluoro-additive with PFOA and THFA was prepared as follows. PFOA fluoroacrylate precursor (20 wt %), THFA (77 wt %), AIBN initiator (2-3 wt % of adduct) and THF solvent (degassed) were charged together in a high reaction flask under nitrogen atmosphere in a glove box. The reaction flask was kept under stirring overnight on a hot plate at 70° C. The reaction was monitored via proton nuclear magnetic resonance (1H-NMR) spectroscopy. After completion of the reaction, the product was concentrated from the THF solvent by rotary evaporator. The fluoro acrylate content of the reaction product adduct was 20% by weight.

Comparative Sample 1: A comparative thermoset composition and coating with THFA, HDDA, and nanosilica, but without an omniphobic fluoro-additive was prepared as follows. Tetrahydrofurfuryl acrylate (THFA) was UV-cured with nano-silica incorporated hexanediol diacrylate HDDA crosslinker (nano-CL) at varying wt. % loadings of 5%, 10%, 15%, 20%, 25% (e.g., denoted as "CL-5%" to indicate a 5 wt. % loading of the nano-CL, etc.). The anti-dirt property was compared with the UV-cured coating of pristine THFA (only) as a control. Nano-silica dispersed hexanediol diacrylate HDDA was also UV-cured separately to examine the synergistic effect of nano-silica in comparison to THFA/HHDA system without nano-silica. UV curing was achieved by mixing the calculated amounts of ingredients (THFA and nano-silica incorporated into HDDA crosslinker) with dimethyl-hydroxy acetophenone (DMHAP) photo-initiator (2 wt %) and casting this mixture on glass slides followed by passing them through a benchtop conveyor UV curing machine at conveyor belt speed of 5 m/min.

Comparative Sample 2: A comparative thermoset composition and coating with IBOA, HDDA, and nanosilica, but without an omniphobic fluoro-additive was prepared as follows. Isobornyl acrylate (IBOA) was UV cured with nano-silica incorporated hexanediol diacrylate HDDA crosslinker (nano-CL) at varying wt. % loadings of 5%, 10%, 15%, 20%, 25%. The anti-dirt property was compared with both neat glass as well as with UV cured coating of pristine IBOA (only) as a control. UV curing was achieved in a similar way as mentioned above for the THFA system in Comparative Sample 1.

Comparative Sample 3: A comparative thermoset composition and coating with TMPTA, CTFA, and nanosilica, but without an omniphobic fluoro-additive was prepared as generally described above in Comparative Sample 1. Specifically, nano-silica (about 20 nm average diameter) dispersed in trimethylolpropantriacrylate (TMPTA) and cyclic trimethylolpropaneformalacrylate (CTFA) crosslinkers were also UV cured separately.

Sample 1: A dirt-repellent omniphobic thermoset composition and coating according to the disclosure with IBOA, HDDA, nanosilica, and the omniphobic additive A was prepared as follows. A calculated amount of prepared fluoro-additive A described above was weighed in a glass vial and diluted with THF solvent. Then it was mixed with Isobornyl acrylate IBOA monomer and homogenized by vertex followed by the addition of nano-silica incorporated hexanediol diacrylate HDDA and dimethylhydroxyacetophenone (DMHAP) as photo-initiator (2 wt %). The homogenized mixture was then cast on glass slides by using a metal applicator. The casted coatings were UV cured by passing them through a benchtop conveyor UV curing machine at a conveyor belt speed of 5 m/min and characterized. The principal coating matrix was comprised of various wt. % ratios of isobornyl acrylate (IBOA) and nano-silica dispersed in hexanediol diacrylate HDDA crosslinker (nano-CL), i.e., (IBOA:nano CL)=about 85:14, 80:19, and 75:24 weight ratios. While further, each composition was separately incorporated with various wt. % loading of the prepared fluoro-additive A with about 0.24%, 0.48%, 1.21% by weight of fluoro acrylate additive A in the final coating.

Sample 2: A dirt-repellent omniphobic thermoset composition and coating according to the disclosure with THFA, HDDA, nanosilica, and the omniphobic additive B was prepared as follows. A calculated amount of prepared fluoro-additive B described above was weighed in a glass vial and diluted with THF solvent. Then it was mixed with THFA monomer and homogenized by vertex followed by the addition of nano-silica incorporated hexanediol diacrylate HDDA and dimethylhydroxyacetophenone (DMHAP) as photo-initiator (2 wt %). The homogenized mixture was then cast on glass slides by using a metal applicator. The casted coatings were UV cured by passing them through a benchtop conveyor UV curing machine at a conveyor belt speed of 5 m/min and characterized. The principal coating matrix was comprised of various wt. % ratios of tetrahydrofurfuryl acrylate (THFA) and nano-silica dispersed in hexanediol diacrylate HDDA crosslinker (nano-CL), i.e., (THFA:nano CL)=about 85:14, 80:19, and 75:24 weight ratios. While further, each composition was separately incorporated with various wt. % loading of the prepared fluoro-additive B with about 0.24%, 0.48%, 1.21% by weight of fluoro acrylate additive B in the final coating.

Figure 4:
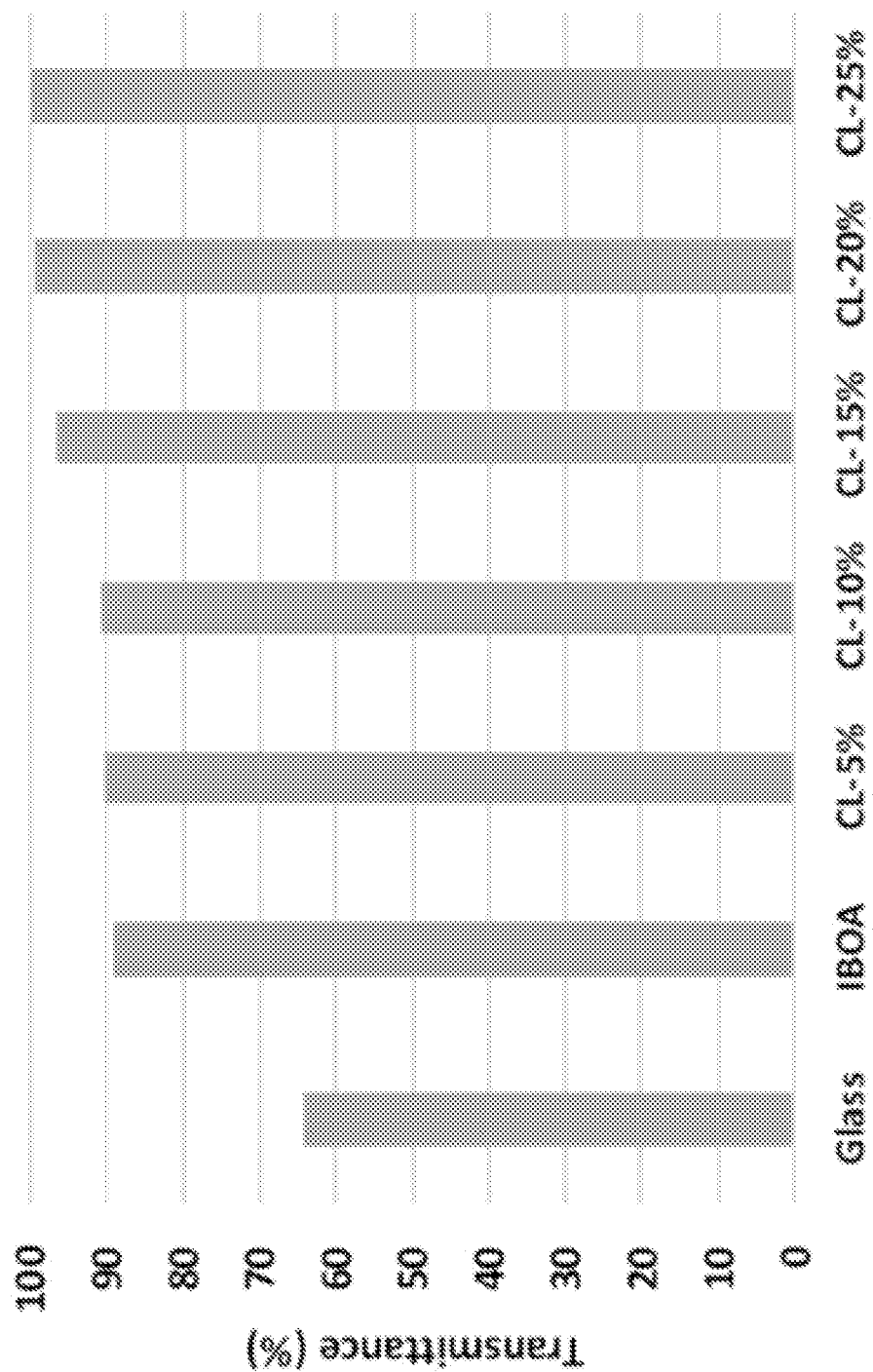
FIG. 4 is a graph showing transmittance (% T) for dirt repellency measurements using A4 test dust on glass substrates coated with a thermoset/nanofiller coating at variable nanofiller loading levels.

Results—Dirt Repellency: Evaluation of various comparative sample coatings (i.e., without a fluoro-additive or other omniphobic polymer) generally showed good anti-dirt properties at nano-filler loading levels of about 15-25% nano-CL. Representative results for Comparative Sample 2 (IBOA, HDDA, nanosilica) are shown in FIG. 4, which shows transmittance (% T) for coated substrates using the A4-coarse dust test dirt described above. Higher % T values indicate better anti-dirt properties. While the comparative sample without omniphobic polymer generally had good anti-dirt properties, they undesirably exhibited relatively significant water spreading.

Figure 5:
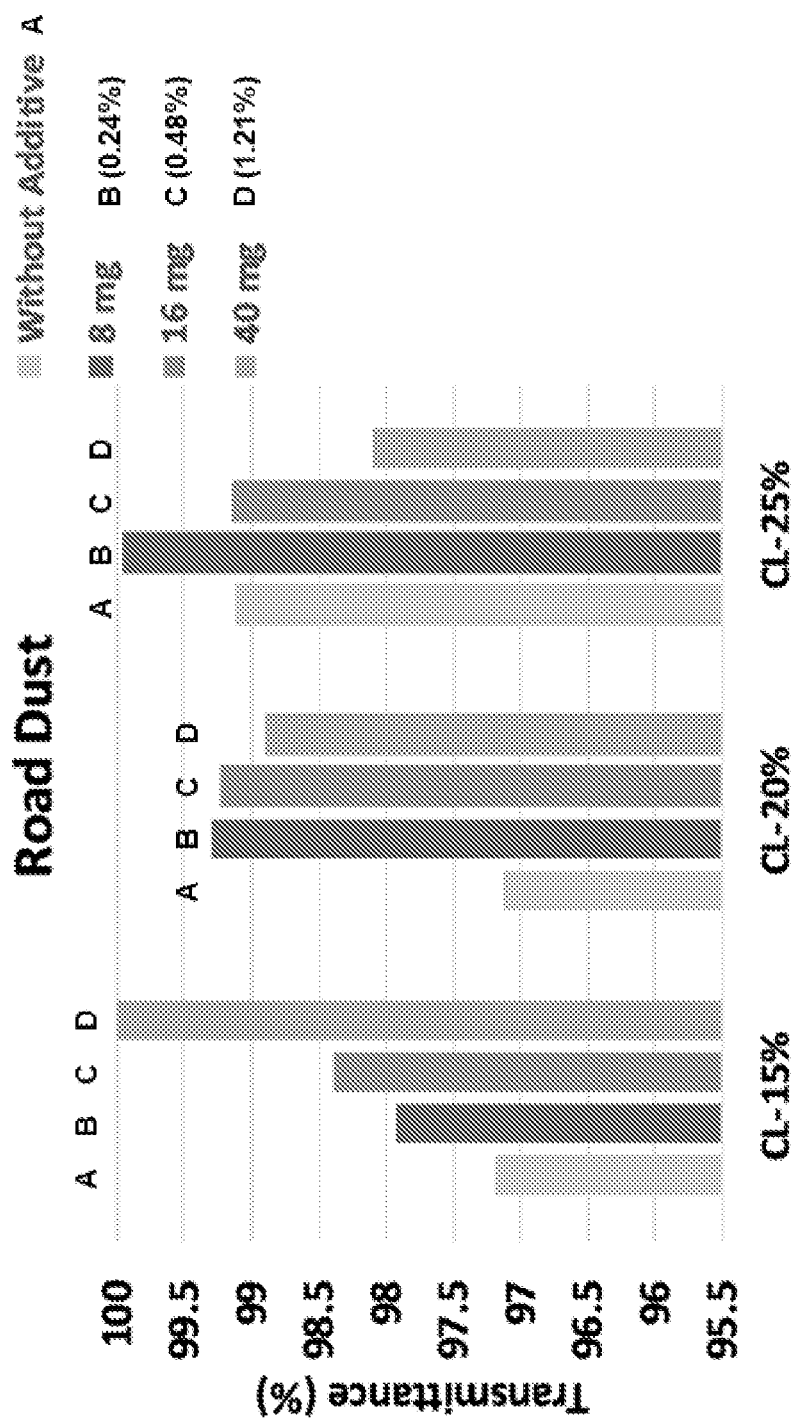
FIG. 5 is a graph showing transmittance (% T) for dirt repellency measurements using road test dust on glass substrates coated with a thermoset/nanofiller or thermoset/omniphobic polymer/nanofiller coating at variable nanofiller and omniphobic polymer loading levels.
Figure 6:
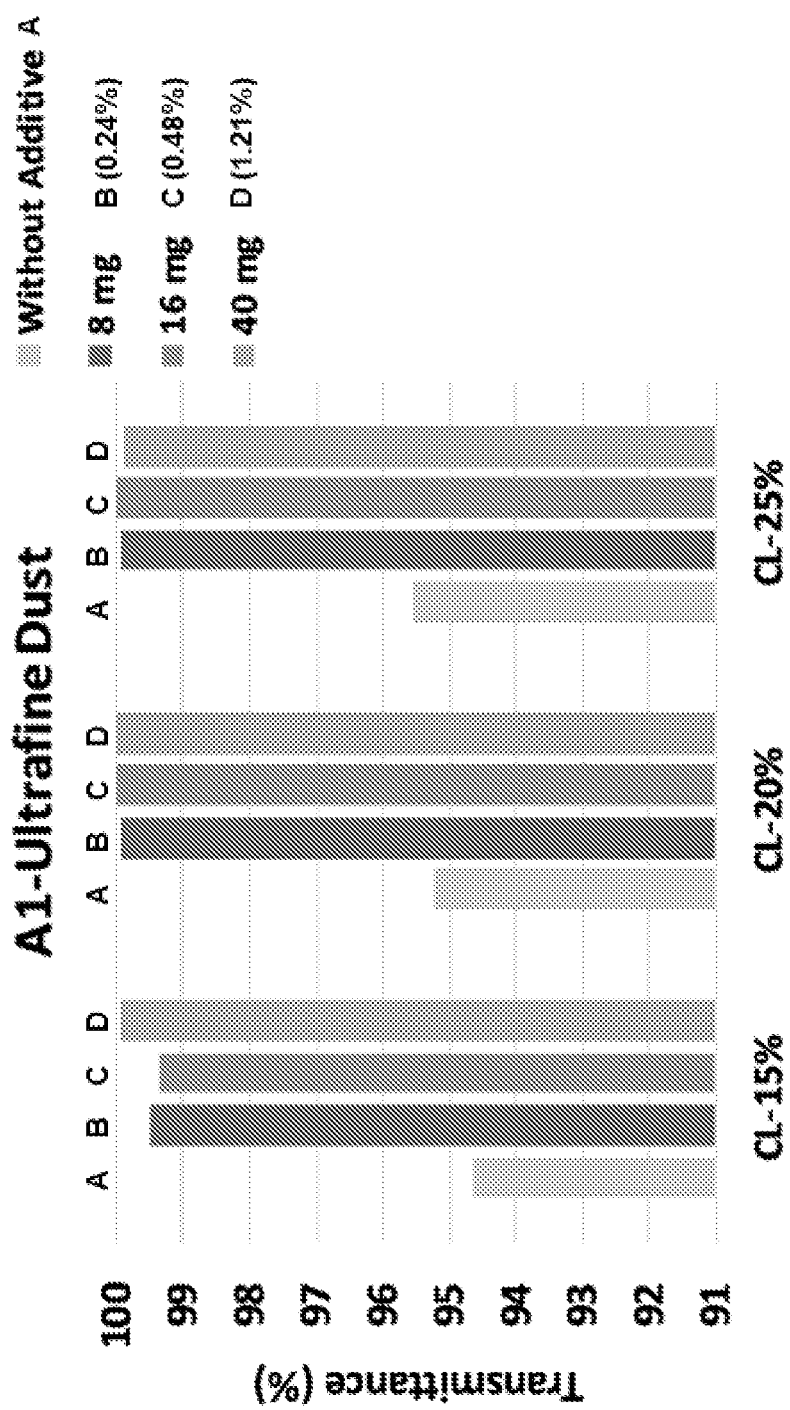
FIG. 6 is a graph showing transmittance (% T) for dirt repellency measurements using A1 test dust on glass substrates coated with a thermoset/nanofiller or thermoset/omniphobic polymer/nanofiller coating at variable nanofiller and omniphobic polymer loading levels.
Figure 7:
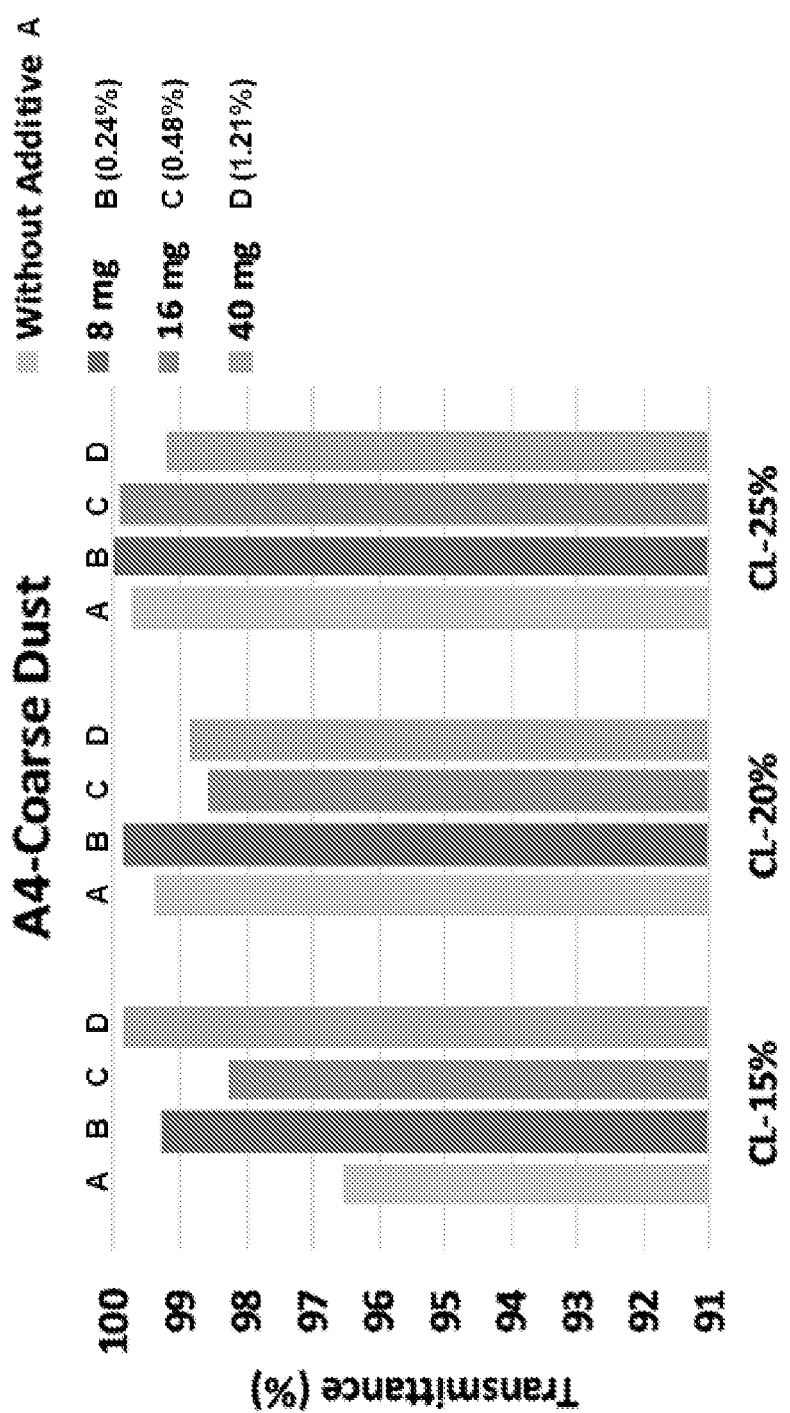
FIG. 7 is a graph showing transmittance (% T) for dirt repellency measurements using A4 test dust on glass substrates coated with a thermoset/nanofiller or thermoset/omniphobic polymer/nanofiller coating at variable nanofiller and omniphobic polymer loading levels.

Notwithstanding the good anti-dirt properties of the comparative samples shown in FIG. 4, the addition of a fluoro-additive omniphobic polymer to the base thermoset/nano-filler coating even further improved the anti-dirt properties of the coating. Representative results for Sample 1 (IBOA, HDDA, nanosilica, and fluoro-additive A) are shown in FIGS. 5-7, which show transmittance (% T) for substrates coated with Comparative Sample 2 ("without additive") or Sample 1 at three different loading levels for fluoro-additive A (8 mg or 0.24 wt. %, 16 mg or 0.48 wt. %, 40 mg or 1.21 wt. %) as a function of nano-CL content (15, 20, or 25% nano-CL). The tests were performed using the road dust (FIG. 5), A1-ultrafine dust (FIG. 6), and A4-coarse dust (FIG. 7) test dirts described above. The thermoset omniphobic compositions further improved the anti-dirt properties, reaching % T values up to about 100%.

Figure 8:
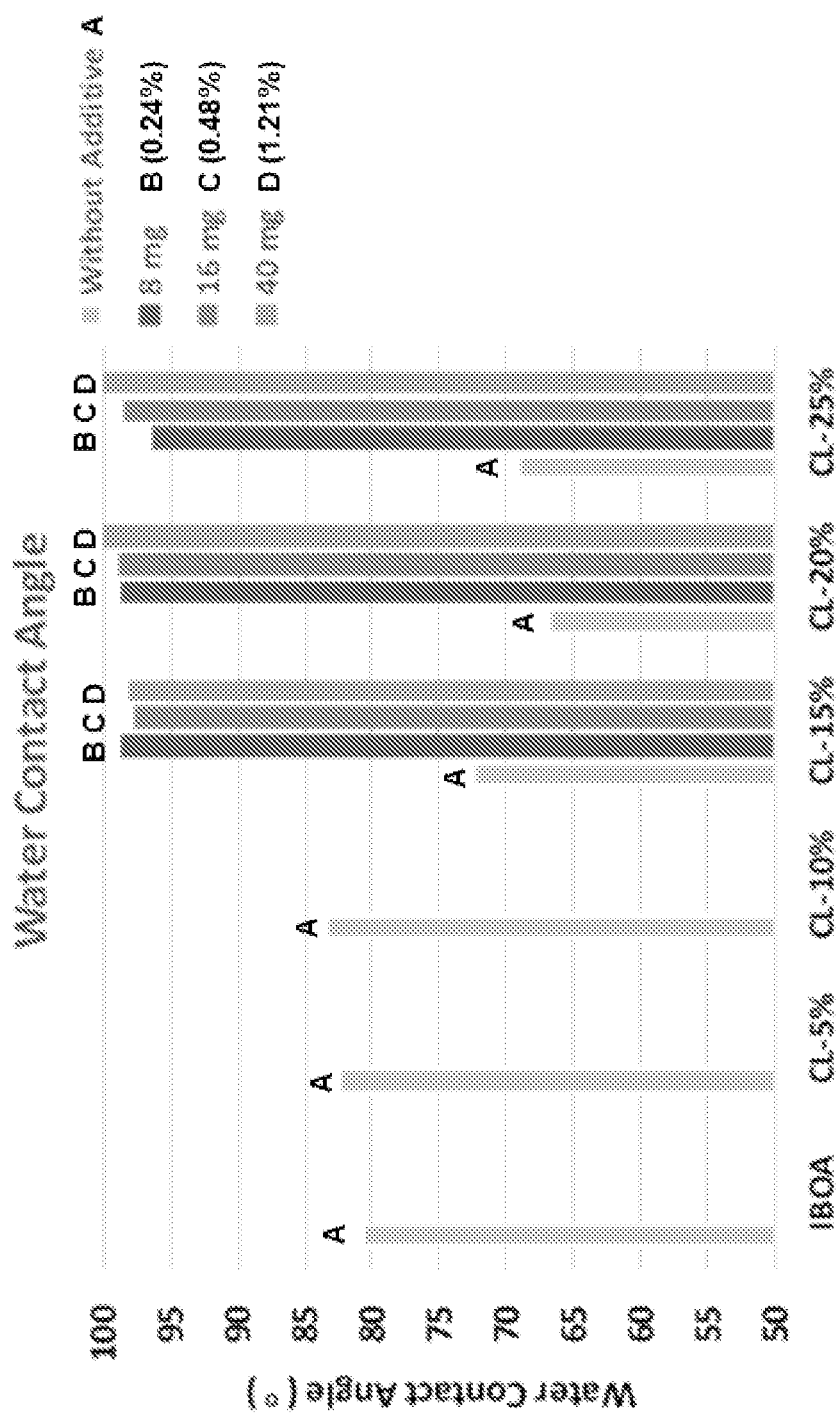
FIG. 8 is a graph showing water contact angle (°) measurements on glass substrates coated with a thermoset/nanofiller or thermoset/omniphobic polymer/nanofiller coating at variable nanofiller and omniphobic polymer loading levels.

Results—Omniphobicity: The addition of a fluoro-additive omniphobic polymer to the base thermoset/nanofiller coating substantially improved the omniphobic properties of the coating, while retaining the good anti-dirt properties noted above. Representative results for Sample 1 (IBOA, HDDA, nanosilica, and fluoro-additive A) are shown in FIG. 8, which shows water contact angles (°) for substrates coated with Comparative Sample 2 ("without additive") or Sample 1 at three different loading levels for fluoro-additive A (8 mg or 0.24 wt. %, 16 mg or 0.48 wt. %, 40 mg or 1.21 wt. %) as a function of nano-CL content (IBOA control and 5, 10, 15, 20, or 25% nano-CL). Water contact angles are above 90° for the samples with the fluoro-additive omniphobic polymer, which indicate a hydrophobic character and improved omniphobic properties.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A thermoset omniphobic composition comprising:
    a thermoset polymer comprising a polymerization reaction product between: an ethylenic-polyfunctional first monomer, and optionally an ethylenic-functional second monomer which is different from the ethylenic-polyfunctional first monomer;
    an omniphobic polymer comprising a copolymer between: an ethylenic-functional omniphobic third monomer, and an ethylenic-functional fourth monomer different from the third monomer; and
    at least one filler distributed throughout the thermoset polymer, the filler being selected from the group consisting of nanoclay, graphene oxide, graphene, silicon dioxide (silica), aluminum oxide, cellulose nanocrystals, carbon nanotubes, titanium dioxide (titania), diatomaceous earth, and combinations thereof;
    wherein a combined amount of the thermoset polymer, the omniphobic polymer, and the at least one filler is at least 95 wt. % of the thermoset omniphobic composition.

2. The composition of claim 1, wherein the ethylenic-polyfunctional first monomer is selected from the group consisting of 1,6-hexanediol diacrylate (HDDA), 1,4-butane diol diacrylate (BDDA), 1,6-hexanediol dimethyl acrylate (HDMDA), 1,4-benzenediol dimethyl acrylate (BDMDA), trimethylolpropane triacrylate (TMPTA), trimethylolpropane formalacrylate, dipropylene glycol diacrylate (DPGDA), pentaerythritol triacrylate (PETIA), and combinations thereof.

3. The composition of claim 1, wherein the ethylenic-functional second monomer is present in the thermoset polymer and is selected from the group consisting of isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl) benzotriazole, phenyl methacrylate, 2-phenylethyl acrylate, 2-phenylethyl methacrylate, phenyl acrylate, cinnamyl methacrylate, benzyl acrylate, and combinations thereof.

4. The composition of claim 1, wherein the ethylenic-functional fourth monomer is selected from the group consisting of isobornyl acrylate, tetrahydrofurfuryl acrylate, dicyclopentenyloxyethyl acrylate, 4-methacryloxy-2-hydroxybenzophenone, 2-(2'-methacryloxy-5'-methylphenyl) benzotriazole, phenyl methacrylate, 2-phenylethyl acrylate, 2-phenylethyl methacrylate, phenyl acrylate, cinnamyl methacrylate, benzyl acrylate, and combinations thereof.

5. The composition of claim 1, wherein:
    the ethylenic-functional second monomer is present in the thermoset polymer; and
    the ethylenic-functional fourth monomer is the same as the ethylenic-functional second monomer.

6. The composition of claim 1, wherein the ethylenic-functional omniphobic third monomer comprises a fluorinated acrylate ester.

7. The composition of claim 1, wherein the at least one filler is a silicon dioxide nanofiller.

8. A thermoset omniphobic composition comprising:
    a thermoset polymer comprising a polymerization reaction product between: an ethylenic-polyfunctional first monomer, and optionally an ethylenic-functional second monomer which is different from the ethylenic-polyfunctional first monomer;
    an omniphobic polymer; and
    at least one filler distributed throughout the thermoset polymer, the filler being selected from the group consisting of nanoclay, graphene oxide, graphene, silicon dioxide (silica), aluminum oxide, cellulose nanocrystals, carbon nanotubes, titanium dioxide (titania), diatomaceous earth, and combinations thereof;
    wherein the at least one filler is ethylenic-functional.

9. The composition of claim 1, wherein the at least one filler has a size of 40 nm or less.

10. The composition of claim 1, wherein the at least one filler has a size of 5000 nm or less.

11. The composition of claim 1, wherein:
    the thermoset polymer and the omniphobic polymer are present in the thermoset omniphobic composition in a combined amount ranging from 50 wt. % to 95 wt. %; and
    the at least one filler is present in the thermoset omniphobic composition in an amount ranging from 5 wt. % to 50 wt. %.

12. The composition of claim 1, wherein the ethylenic-polyfunctional first monomer is present in the thermoset polymer in an amount ranging from 5 wt. % to 95 wt. %.

13. The composition of claim 1, wherein the ethylenic-functional second monomer is present in the thermoset polymer in an amount ranging from 30 wt. % to 95 wt. %.

14. The composition of claim 1, wherein the omniphobic polymer is present in the thermoset omniphobic composition in an amount ranging from 0.1 wt. % to 10 wt. %.

15. The composition of claim 1, wherein the composition has a water contact angle in a range from 90° to 179°.

16. The composition of claim 1, wherein the composition has an oil contact angle in a range from 1° to 150°.

17. The composition of claim 1, wherein the composition has a water sliding angle in a range from 1° to 60° for a 75 µl droplet.

18. The composition of claim 1, wherein the composition has an oil sliding angle in a range from 1° to 50° for a 10 µl droplet.

19. A coated article comprising:
(a) a substrate; and
(b) a thermoset omniphobic composition according to claim 1, coated on a surface of the substrate.

20. The coated article of claim 19, wherein the substrate is selected from the group of metal, plastics, a different thermoset material, glass, wood, fabric, and ceramics.

21. The coated article of claim 19, wherein the thermoset omniphobic composition has a thickness ranging from 0.01 µm to 500 µm.

22. The coated article of claim 19, wherein the thermoset omniphobic composition coating is scratch-resistant, dirt-repellent, and optically clear.

23. A method for forming a thermoset omniphobic composition, the method comprising:
(a) providing a reaction mixture comprising:
an ethylenic-polyfunctional first monomer;
optionally an ethylenic-functional second monomer which is different from the ethylenic-polyfunctional first monomer;
an omniphobic polymer comprising a copolymer between: an ethylenic-functional omniphobic third monomer, and an ethylenic-functional fourth monomer different from the third monomer; and
at least one filler selected from the group consisting of nanoclay, graphene oxide, graphene, silicon dioxide (silica), aluminum oxide, cellulose nanocrystals, carbon nanotubes, titanium dioxide (titania), diatomaceous earth, and combinations thereof; and
(b) curing the reaction mixture to form the thermoset omniphobic composition of claim 1, wherein a combined amount of the thermoset polymer, the omniphobic polymer, and the at least one filler is at least 95 wt. % of the thermoset omniphobic composition.

24. The method of claim 23, wherein curing the reaction mixture comprises:
applying the reaction mixture to a substrate; and
forming a coating of the thermoset omniphobic composition on the substrate.

25. The method of claim 24, comprising performing one or more of spraying, casting, rolling, and dipping to apply the reaction mixture to the substrate.

26. The composition of claim 1, wherein the omniphobic polymer forms a physical blend with the thermoset polymer.

27. The composition of claim 1, wherein:
the thermoset polymer and the omniphobic polymer are present in the thermoset omniphobic composition in a combined amount ranging from 60 wt. % to 99 wt. %;
the at least one filler is present in the thermoset omniphobic composition in an amount ranging from 1 wt. % to 30 wt. %;
the omniphobic polymer is present in the thermoset omniphobic composition in an amount ranging from 0.1 wt. % to 4 wt. %;
the ethylenic-polyfunctional first monomer is present in the thermoset polymer in an amount ranging from 5 wt. % to 40 wt. %;
the ethylenic-functional second monomer is present in the thermoset polymer in an amount ranging from 60 wt. % to 95 wt. %;
the ethylenic-functional omniphobic third monomer is present in the omniphobic polymer in an amount ranging from 5 wt. % to 80 wt. %;
the ethylenic-functional fourth monomer is present in the omniphobic polymer in an amount ranging from 20 wt. % to 95 wt. %; and
the omniphobic polymer contains not more than 10 wt. % of monomers other than the ethylenic-functional omniphobic third monomer and the ethylenic-functional fourth monomer.

28. The composition of claim 5, wherein:
the thermoset polymer and the omniphobic polymer are present in the thermoset omniphobic composition in a combined amount ranging from 80 wt. % to 99 wt. %;
the at least one filler is present in the thermoset omniphobic composition in an amount ranging from 1 wt. % to 10 wt. %;
the omniphobic polymer is present in the thermoset omniphobic composition in an amount ranging from 0.1 wt. % to 2 wt. %;
the ethylenic-polyfunctional first monomer is present in the thermoset polymer in an amount ranging from 10 wt. % to 20 wt. %;
the ethylenic-functional second monomer is present in the thermoset polymer in an amount ranging from 70 wt. % to 90 wt. %;
the ethylenic-functional omniphobic third monomer is present in the omniphobic polymer in an amount ranging from 20 wt. % to 40 wt. %;
the ethylenic-functional fourth monomer is present in the omniphobic polymer in an amount ranging from 60 wt. % to 80 wt. %;
the omniphobic polymer contains not more than 1 wt. % of monomers other than the ethylenic-functional omniphobic third monomer and the ethylenic-functional fourth monomer; and
the ethylenic-functional omniphobic third monomer comprises omniphobic functional groups selected from the group consisting of fluorocarbon groups and siloxane groups.

* * * * *